United States Patent
Son

(10) Patent No.: US 9,791,667 B2
(45) Date of Patent: Oct. 17, 2017

(54) LENS MODULE

(71) Applicant: SAMSUNG ELECTRO-MECHANICS CO., LTD., Suwon-si (KR)

(72) Inventor: Ju Hwa Son, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 77 days.

(21) Appl. No.: 14/186,896

(22) Filed: Feb. 21, 2014

(65) Prior Publication Data

US 2014/0376107 A1    Dec. 25, 2014

(30) Foreign Application Priority Data

Jun. 25, 2013  (KR) .................. 10-2013-0073177

(51) Int. Cl.
  *G02B 13/00*  (2006.01)

(52) U.S. Cl.
  CPC ........................ *G02B 13/0045* (2013.01)

(58) Field of Classification Search
  CPC ...... G02B 9/62; G02B 13/0045; G02B 13/18; G02B 13/002; G02B 3/04; G02B 9/64; G02B 3/02; G02B 3/10; G02B 13/001; G02B 13/02; G02B 13/04; G02B 13/22; G02B 27/0025; H04N 5/225; H04N 5/2254
  USPC ....... 359/713, 761, 754, 755, 756, 708, 749, 359/752
  See application file for complete search history.

(56) References Cited

U.S. PATENT DOCUMENTS

| 5,349,474 | A | 9/1994 | Shimizu et al. | |
|---|---|---|---|---|
| 8,743,477 | B2* | 6/2014 | Tsai et al. ..................... | 359/713 |
| 2004/0189834 | A1 | 9/2004 | Hagimori et al. | |
| 2006/0007561 | A1 | 1/2006 | Suzuki | |
| 2010/0046094 | A1 | 2/2010 | Asami | |
| 2013/0120858 | A1 | 5/2013 | Sano | |
| 2014/0043694 | A1* | 2/2014 | Tsai ........................ | G02B 3/04 |
| | | | | 359/708 |

(Continued)

FOREIGN PATENT DOCUMENTS

| CN | 201302618 Y | 9/2009 |
|---|---|---|
| EP | 1811326 A2 | 7/2007 |
| JP | 5-188289 A | 7/1993 |

(Continued)

OTHER PUBLICATIONS

Office Action dated Apr. 30, 2014 for corresponding Korean Patent Application No. 10-2013-0073177 and its English summary provided by Applicant's foreign counsel.

(Continued)

*Primary Examiner* — Thomas K Pham
*Assistant Examiner* — Ibrahima Diedhiou
(74) *Attorney, Agent, or Firm* — NSIP Law

(57) ABSTRACT

A lens module including may include: a first lens having negative refractive power; a second lens of which an object-side surface or an image-side surface is convex; a third lens of which an image-side surface is concave; a fourth lens having refractive power; a fifth lens having refractive power; and a sixth lens having an inflection point formed on an image-side surface or an object-side surface thereof. The first to sixth lenses are disposed in a sequential order from the first lens to the sixth lens.

17 Claims, 18 Drawing Sheets

(56) References Cited

U.S. PATENT DOCUMENTS

| 2014/0092491 A1* | 4/2014 | Hsu | G02B 9/62 |
| | | | 359/761 |
| 2014/0118844 A1* | 5/2014 | Tsai | G02B 9/62 |
| | | | 359/713 |

FOREIGN PATENT DOCUMENTS

| JP | 8-313802 A | 11/1996 |
| JP | 2005-352060 | 12/2005 |
| JP | 2011-123210 A | 6/2011 |
| KR | 10-2007-0077099 A | 7/2007 |
| KR | 10-2010-0040357 A | 4/2010 |
| KR | 10-2011-0024872 A | 3/2011 |
| KR | 10-2013-0039758 | 4/2013 |
| TW | 201314257 | 4/2013 |

OTHER PUBLICATIONS

Office Action dated Nov. 12, 2014 for Taiwanese Patent Application No. 103105700 and its English summary provided by Applicant's foreign counsel.

Chinese Office Action dated Jan. 19, 2016 in counterpart Chinese Application No. 201410084060.6 (17 pages in Chinese with English translation).

\* cited by examiner

LENS MODULE

CROSS-REFERENCE TO RELATED APPLICATION

This application claims the benefit of Korean Patent Application No. 10-2013-0073177 filed on Jun. 25, 2013, with the Korean Intellectual Property Office, the disclosure of which is incorporated herein in its entirety by reference.

BACKGROUND

The present technology generally relates to a lens module including an imaging optical system including six lenses. Unless otherwise indicated herein, the materials described in this section are not prior art to the claims herein and are not admitted to be prior art by inclusion in this section.

Mobile communications terminals commonly include camera modules so that video calls and image capturing are possible. In addition, as functions of camera modules included in mobile communications terminals have gradually increased, cameras for mobile communications terminals have been gradually required to have high degrees of resolution and high levels of performance.

However, since there is a trend for mobile communications terminals to be miniaturized and lightened, there is a limitation in implementing camera modules having high degrees of resolution and high levels of performance.

In order to solve these problems, recently, lenses within such camera modules have been formed of plastic, a substance lighter than glass, and a lens module has been configured using five or more lenses in order to implement high degrees of resolution.

However, in the case of using such lenses, improvements of chromatic aberration may be problematic and it may be relatively more difficult to implement a relatively bright optical system using lenses formed of plastic than lenses formed of glass.

SUMMARY

Some embodiments of the present disclosure may provide a lens module capable of improving an aberration improvement effect and implementing high resolution.

According to some embodiments of the present disclosure, a lens module may include a first lens having negative refractive power, a second lens of which an object-side surface or an image-side surface is convex, a third lens of which an image-side surface is concave, a fourth lens having refractive power, a fifth lens having refractive power, and a sixth lens having an inflection point formed on an image-side surface or an object-side surface thereof.

The first to sixth lenses may be formed of plastic.

An object-side surface or an image-side surface of the first lens may be concave.

An image-side surface of the fourth lens may be convex.
An object-side surface of the fifth lens may be concave.
An image-side surface of the fifth lens may be convex.
An object-side surface of the sixth lens may be convex.
An image-side surface of the sixth lens may be concave.
An optical system including the first to sixth lenses may satisfy Conditional Equation 1:

$$TTL/IMGH<2 \qquad \text{[Conditional Equation 1]}$$

where TTL is a distance from an object-side surface of the first lens to an imaging surface, and IMGH is a length of the imaging surface.

An optical system including the first to sixth lenses may satisfy Conditional Equation 2:

$$0.5<SL/TTL<1.1 \qquad \text{[Conditional Equation 2]}$$

where SL is a distance from a stop to an imaging surface, and TTL is a distance from an object-side surface of the first lens to the imaging surface.

An optical system including the first to sixth lenses may satisfy Conditional Equation 3:

$$ANG/F\ No.>34 \qquad \text{[Conditional Equation 3]}$$

where ANG is a viewing angle of an object, and an F No. of an optical system including the first to sixth lenses may be 2.2 or less.

According to some embodiments of the present disclosure, a lens module may include, in order from an object side to an image side: a first lens having negative refractive power; a second lens having positive refractive power; a third lens of which an image-side surface is concave; a fourth lens of which an image-side surface is convex; a fifth lens having positive refractive power; and a sixth lens having negative refractive power.

An optical system including the first to sixth lenses may satisfy Conditional Equation 1:

$$TTL/IMGH<2 \qquad \text{[Conditional Equation 1]}$$

where TTL is a distance from an object-side surface of the first lens to an imaging surface, and IMGH is a length of the imaging surface.

An optical system including the first to sixth lenses may satisfy Conditional Equation 2:

$$0.5<SL/TTL<1.1 \qquad \text{[Conditional Equation 2]}$$

where SL is a distance from a stop to an imaging surface, and TTL is a distance from an object-side surface of the first lens to the imaging surface.

An optical system including the first to sixth lenses may satisfy Conditional Equation 3:

$$ANG/F\ No.>34 \qquad \text{[Conditional Equation 3]}$$

where ANG is a viewing angle of an object, and an F No. of an optical system including the first to sixth lenses may be 2.2 or less.

BRIEF DESCRIPTION OF DRAWINGS

Embodiments of the present disclosure will be more clearly understood from the following detailed description taken in conjunction with the accompanying drawings, in which.

DETAILED DESCRIPTION

Figure 1:
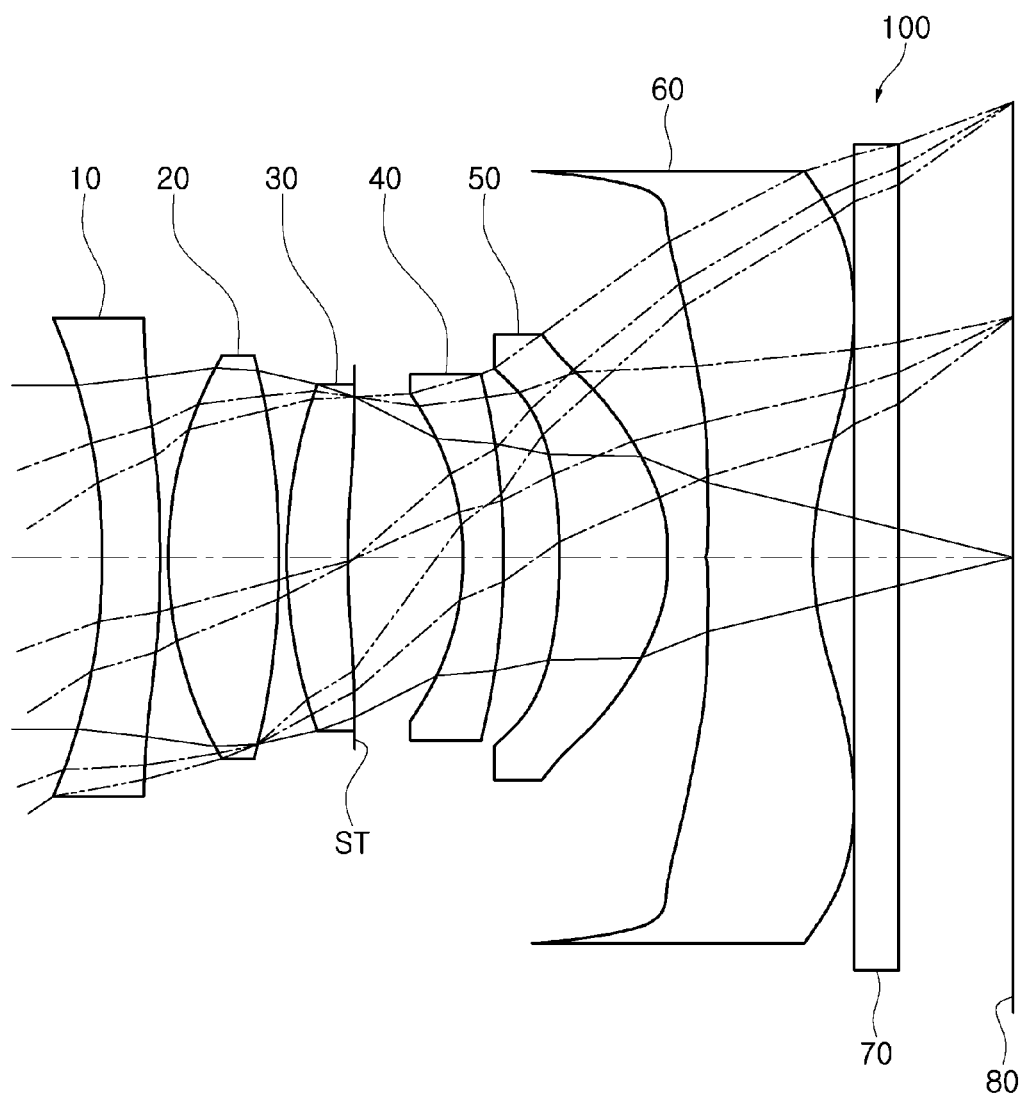
FIG. 1 is a configuration diagram of a lens module according to an exemplary embodiment of the present disclosure.

Exemplary embodiments of the present disclosure will now be described in detail with reference to the accompanying drawings.

The disclosure may, however, be exemplified in many different forms and should not be construed as being limited to the specific embodiments set forth herein. Rather, these embodiments are provided to explain the principles of the invention and its practical applications, thereby enabling others skilled in the art to understand the invention for various embodiments and with various modifications as are suited to the particular use contemplated.

In the drawings, the shapes and dimensions of elements may be exaggerated for clarity, and the same reference numerals will be used throughout to designate the same or like elements. It will also be understood that, although the terms first, second, etc. may be used herein to describe various elements, these elements should not be limited by these terms. These terms are only used to distinguish one element from another. As used in this description and the appended claims, the singular forms "a", "an" and "the" are intended to include the plural forms as well, unless the context clearly indicates otherwise.

It is noted that in the present specification, a first lens refers to a lens closest to an object, and a sixth lens refers to a lens closest to an imaging surface. Further, it is noted that the term 'front' refers to a direction from the lens module toward an object, while the term 'rear' refers to a direction from the lens module toward an image sensor. Further, it is noted that in each lens, a first surface refers to a surface toward an object (or an object-side surface) and a second surface refers to a surface toward an image (or an image-side surface). Further, it is noted that in the present specification, units of all of radii (RDY), thicknesses (THI), TTLs, IMGHs, and SLs of lenses are in mm.

Figure 2:
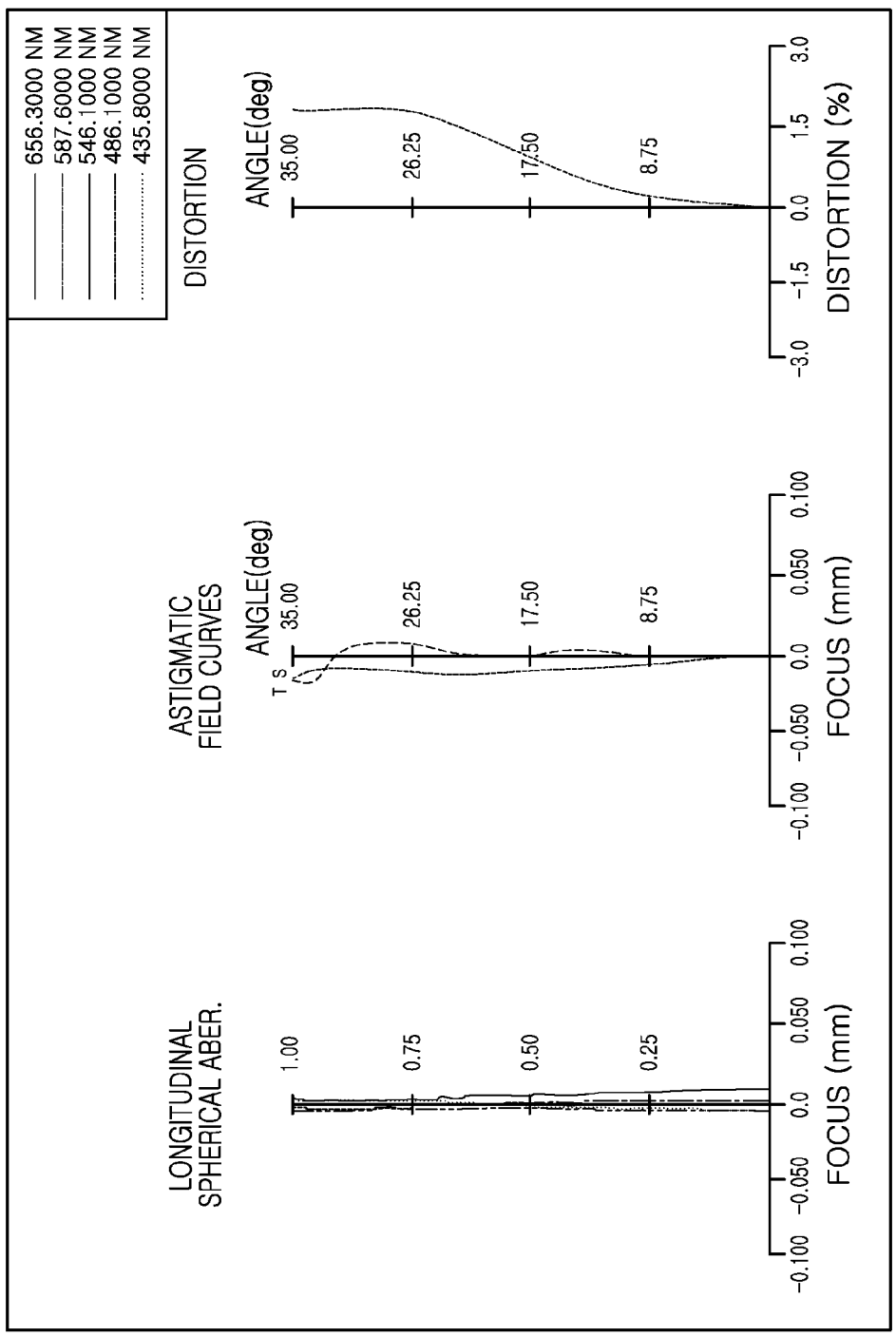
FIG. 2 is graphs illustrating aberration characteristics of the lens module illustrated in FIG. 1.
Figure 3:
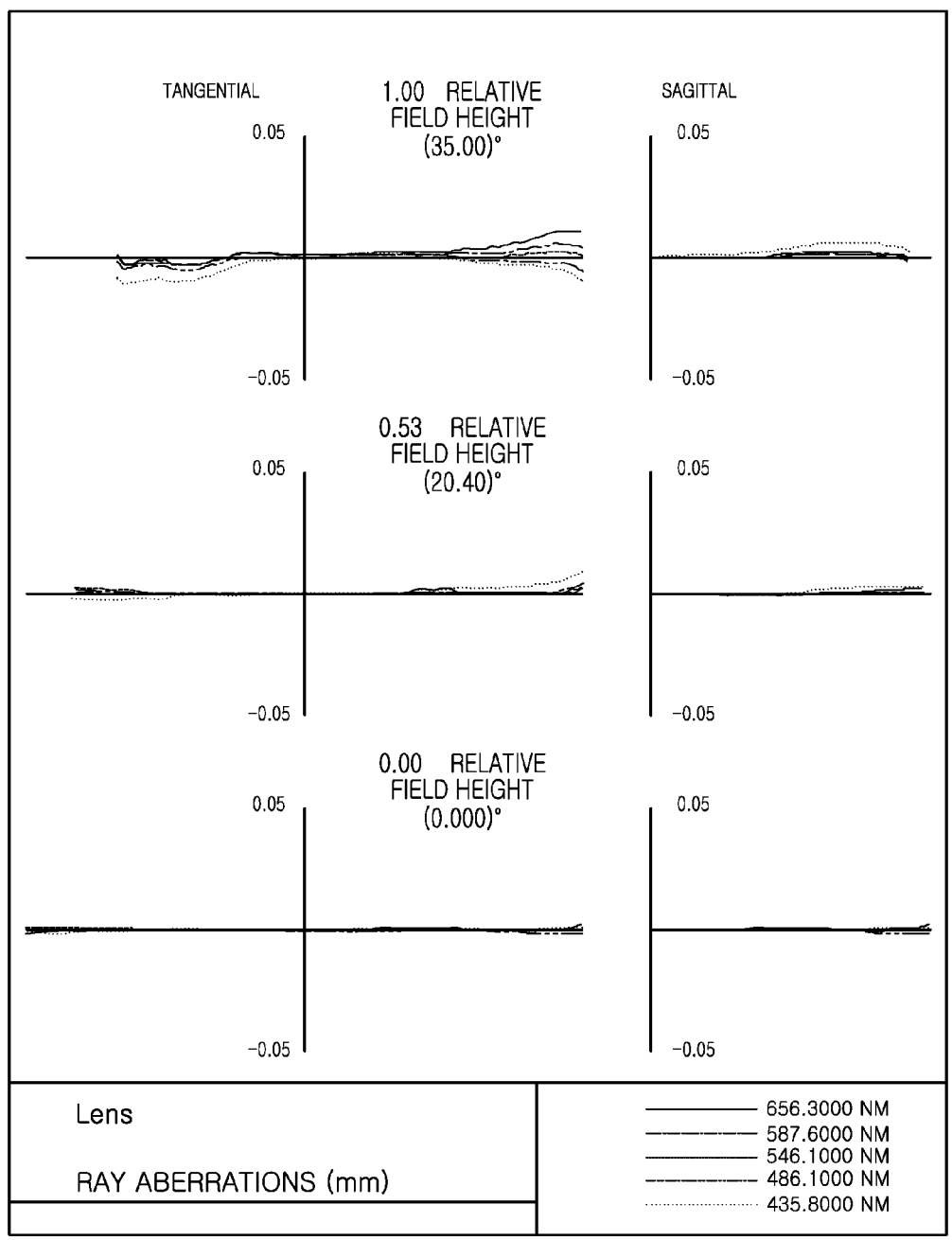
FIG. 3 is graphs illustrating coma aberration characteristics of the lens module illustrated in FIG. 1.
Figure 4:
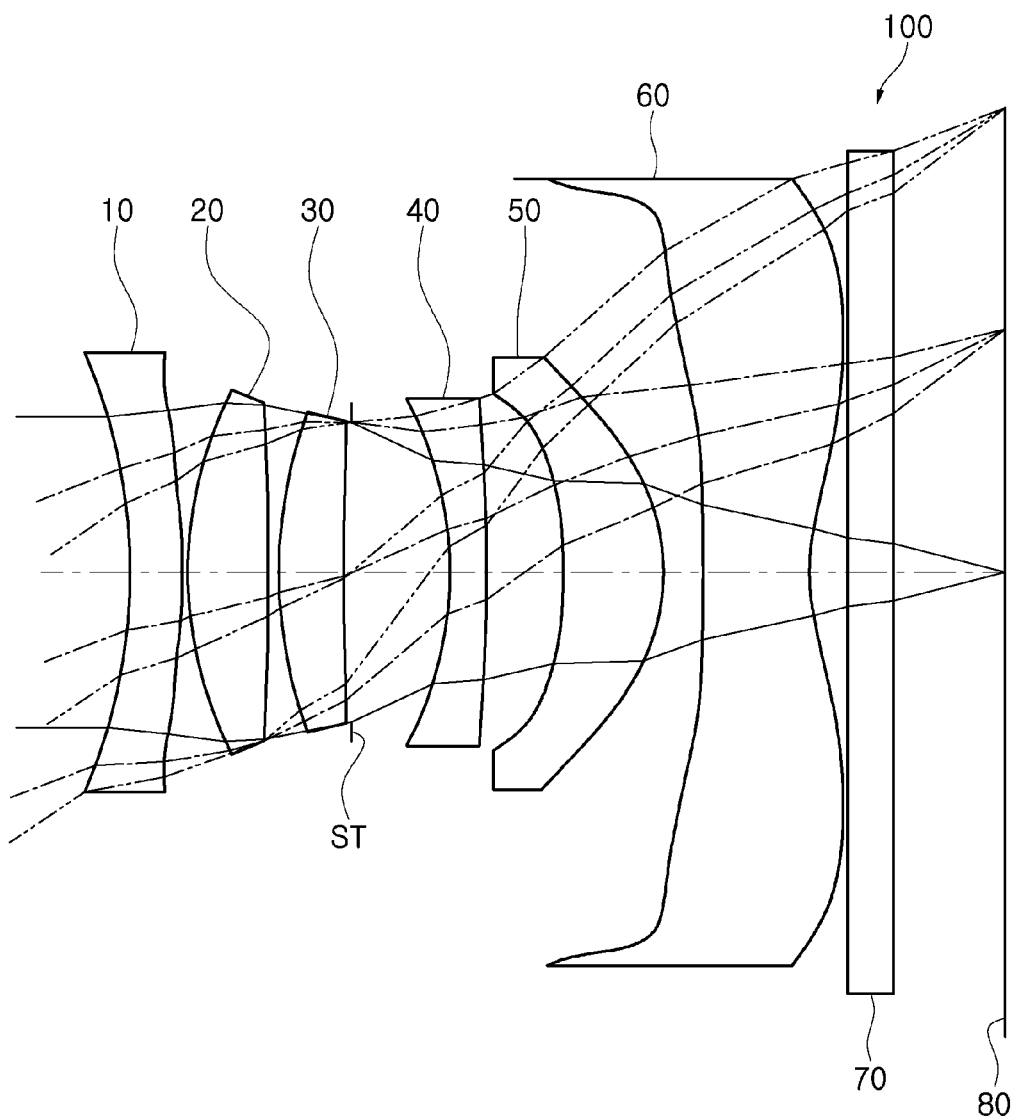
FIG. 4 is a configuration diagram of a lens module according to a second exemplary embodiment of the present disclosure.
Figure 5:
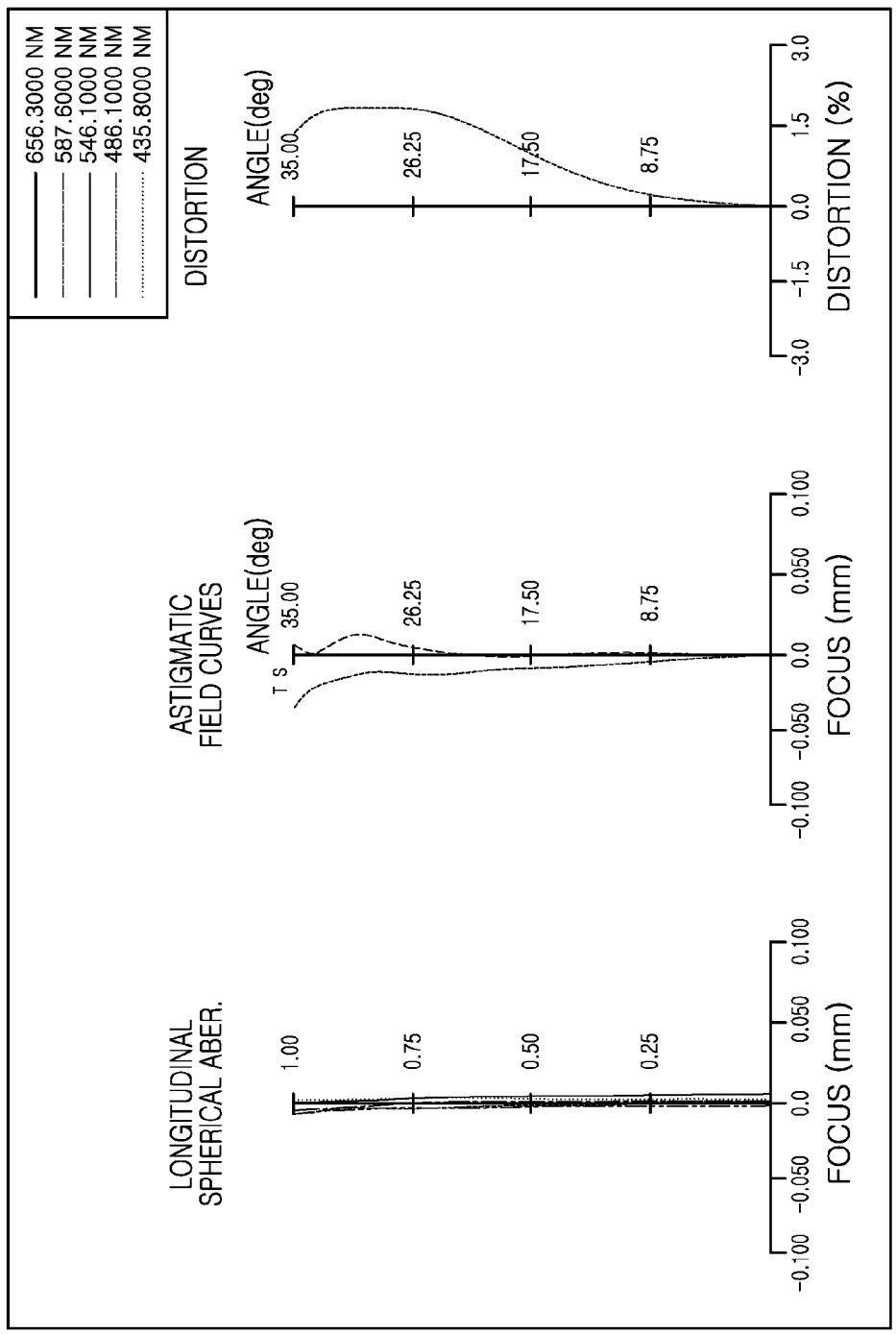
FIG. 5 is graphs illustrating aberration characteristics of the lens module illustrated in FIG. 4.
Figure 6:
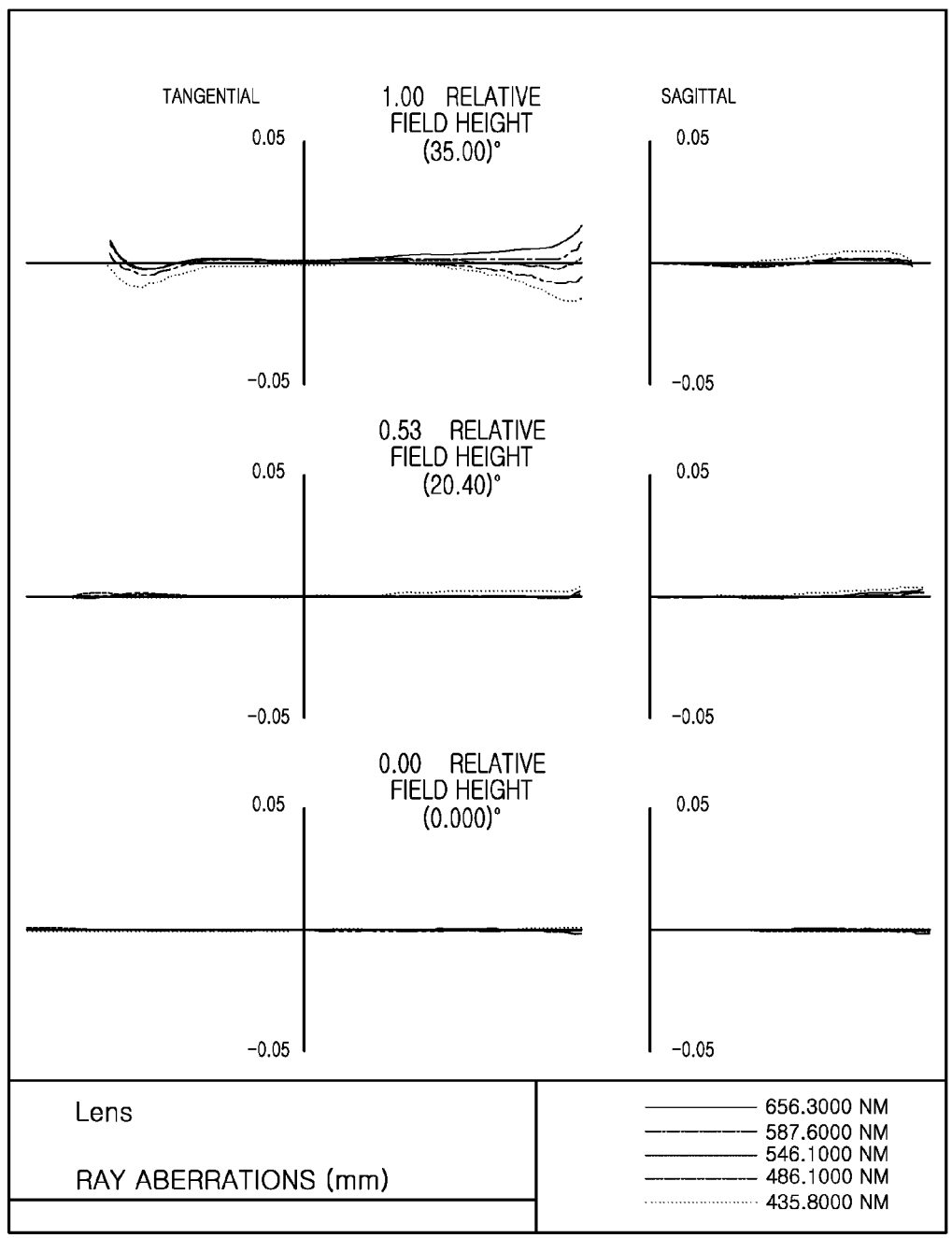
FIG. 6 is graphs illustrating coma aberration characteristics of the lens module illustrated in FIG. 4.
Figure 7:
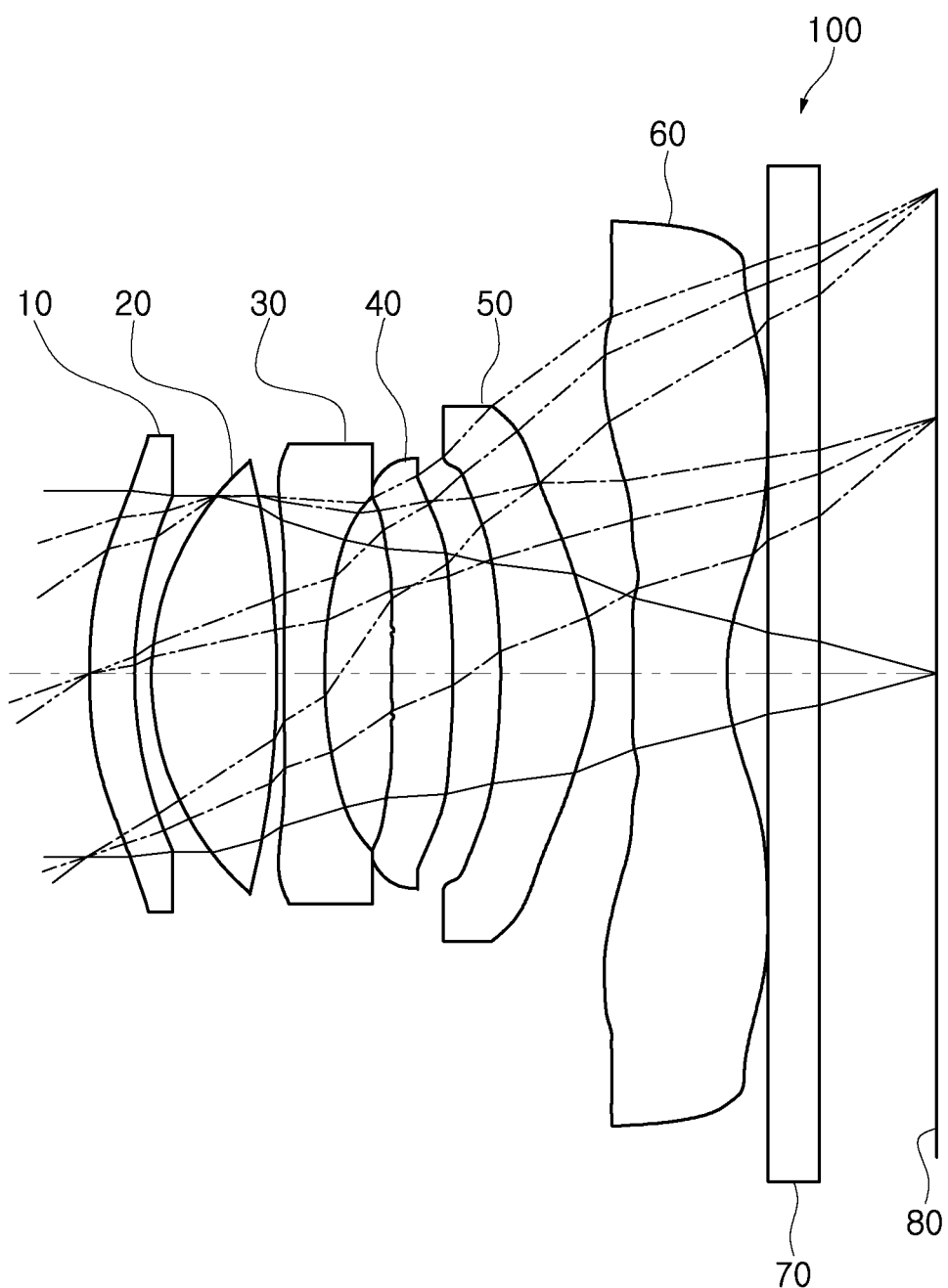
FIG. 7 is a configuration diagram of a lens module according to a third exemplary embodiment of the present disclosure.
Figure 8:
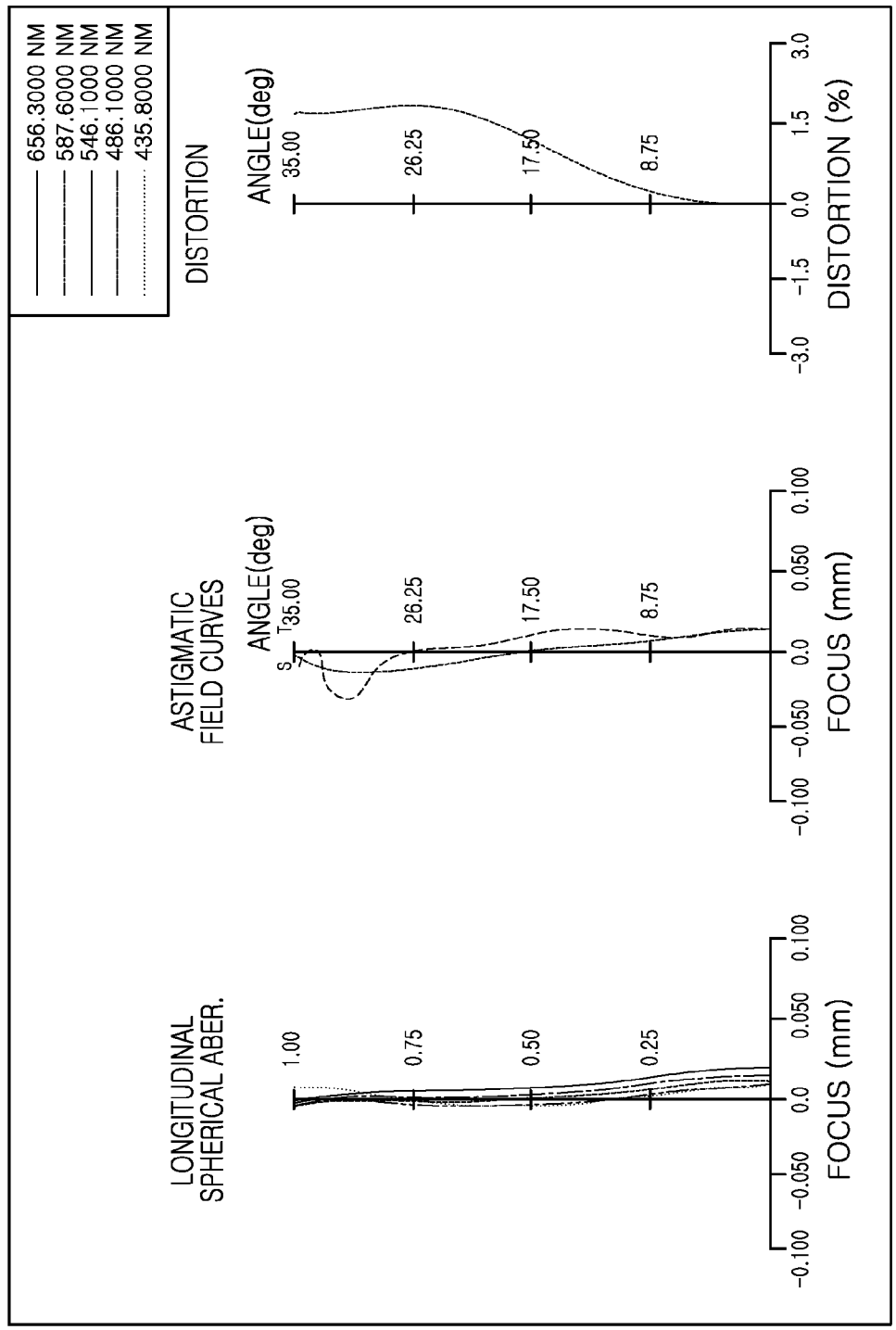
FIG. 8 is graphs illustrating aberration characteristics of the lens module illustrated in FIG. 7.
Figure 9:
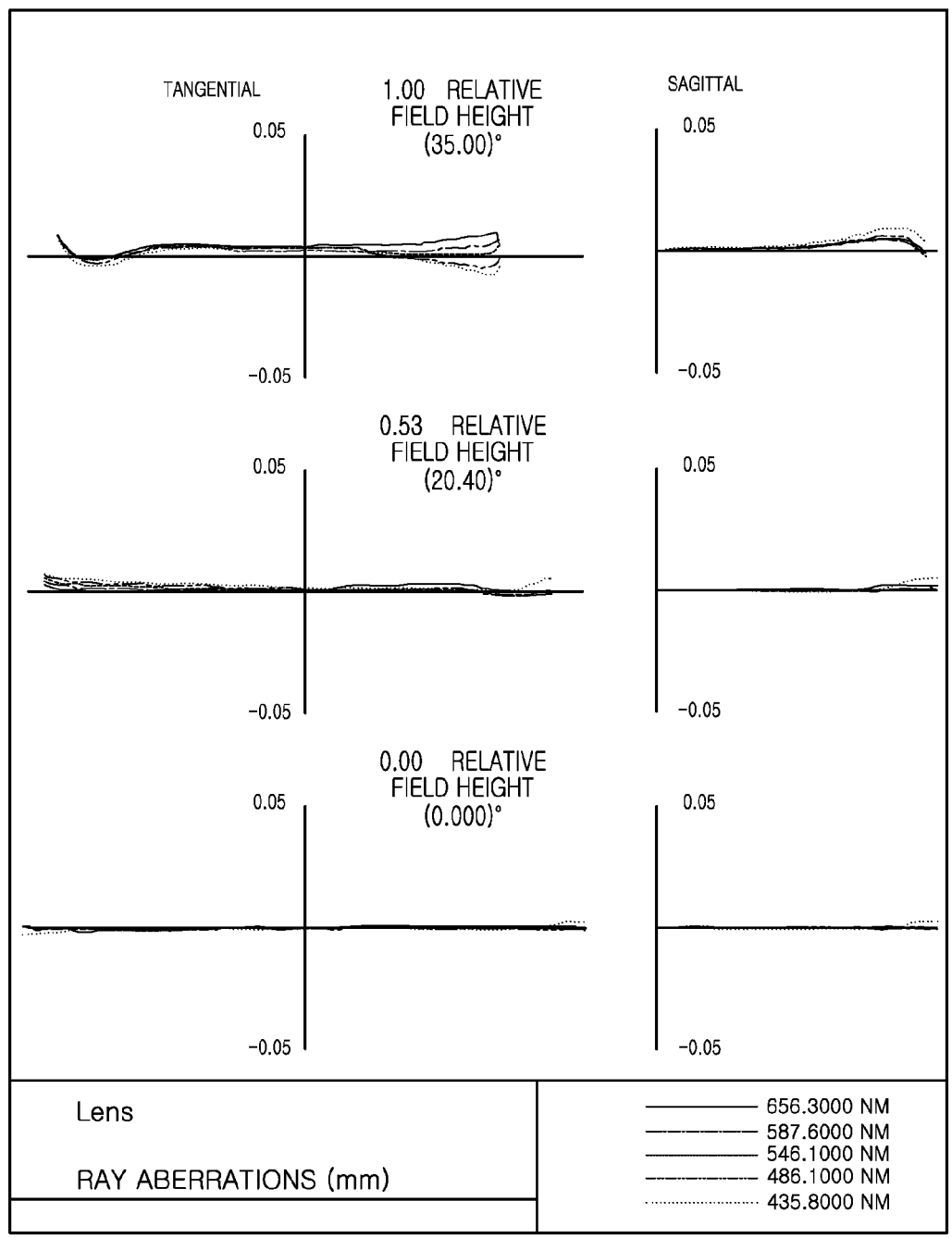
FIG. 9 is graphs illustrating coma aberration characteristics of the lens module illustrated in FIG. 7.
Figure 10:
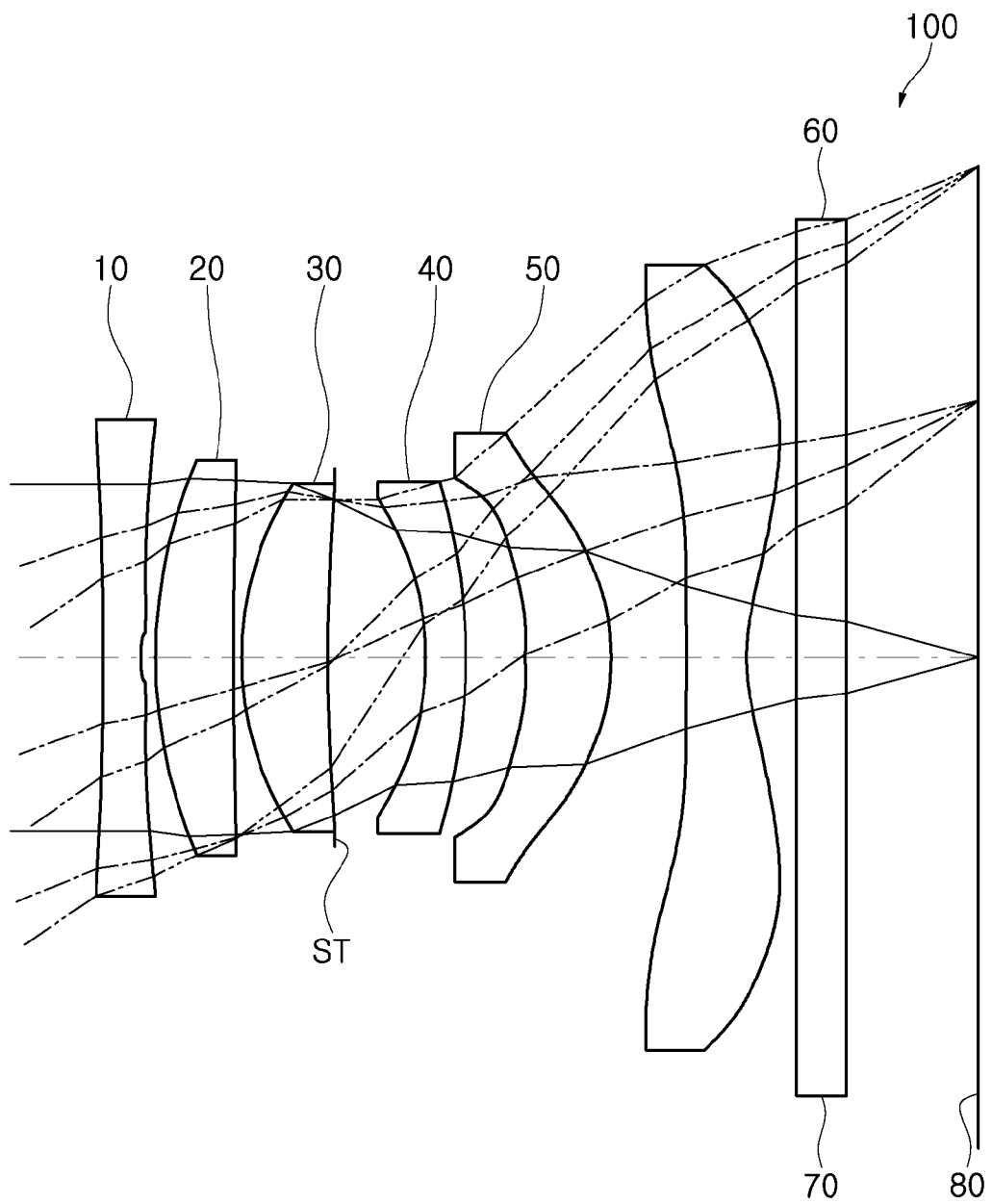
FIG. 10 is a configuration diagram of a lens module according to a fourth exemplary embodiment of the present disclosure.
Figure 11:
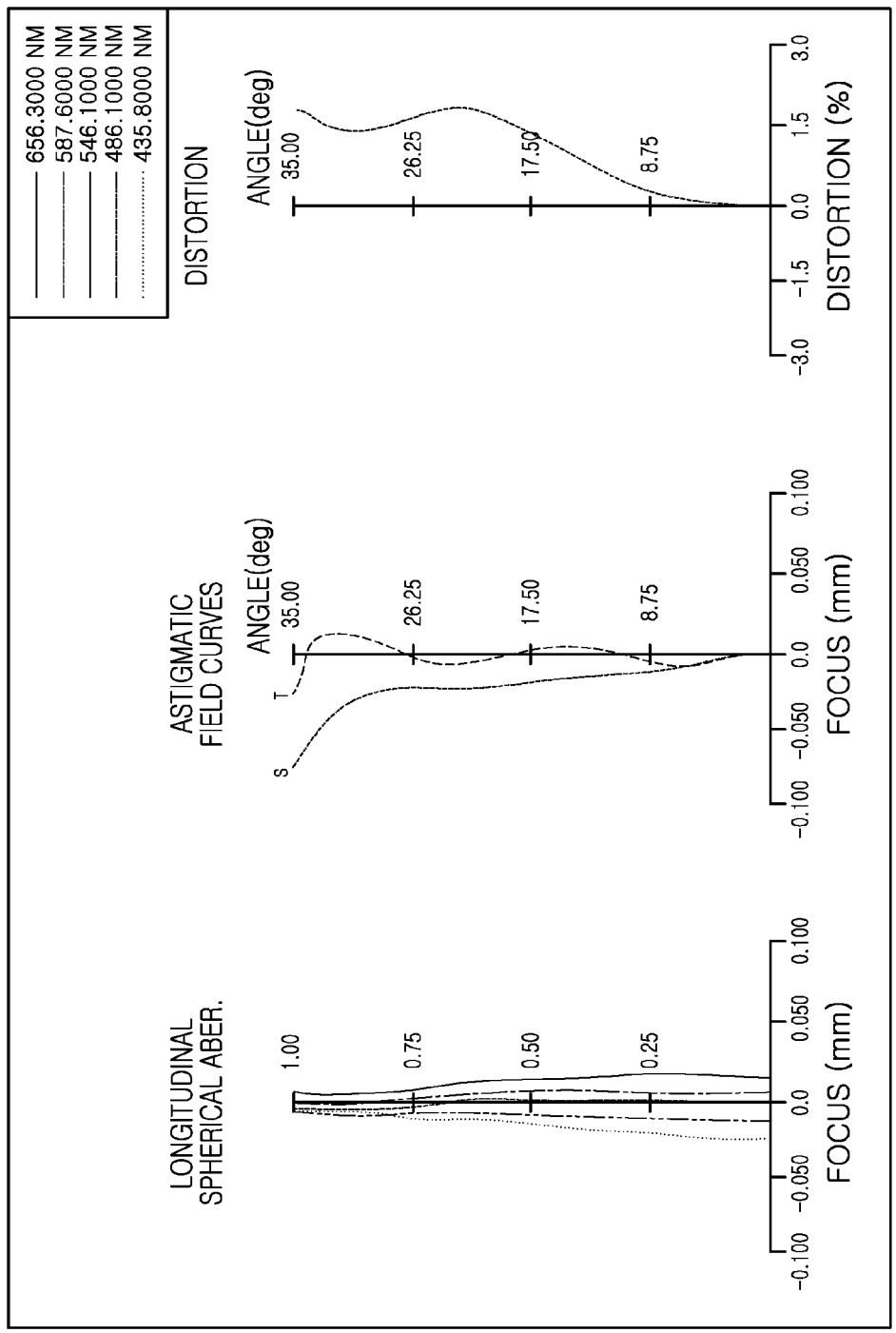
FIG. 11 is graphs illustrating aberration characteristics of the lens module illustrated in FIG. 10.
Figure 12:
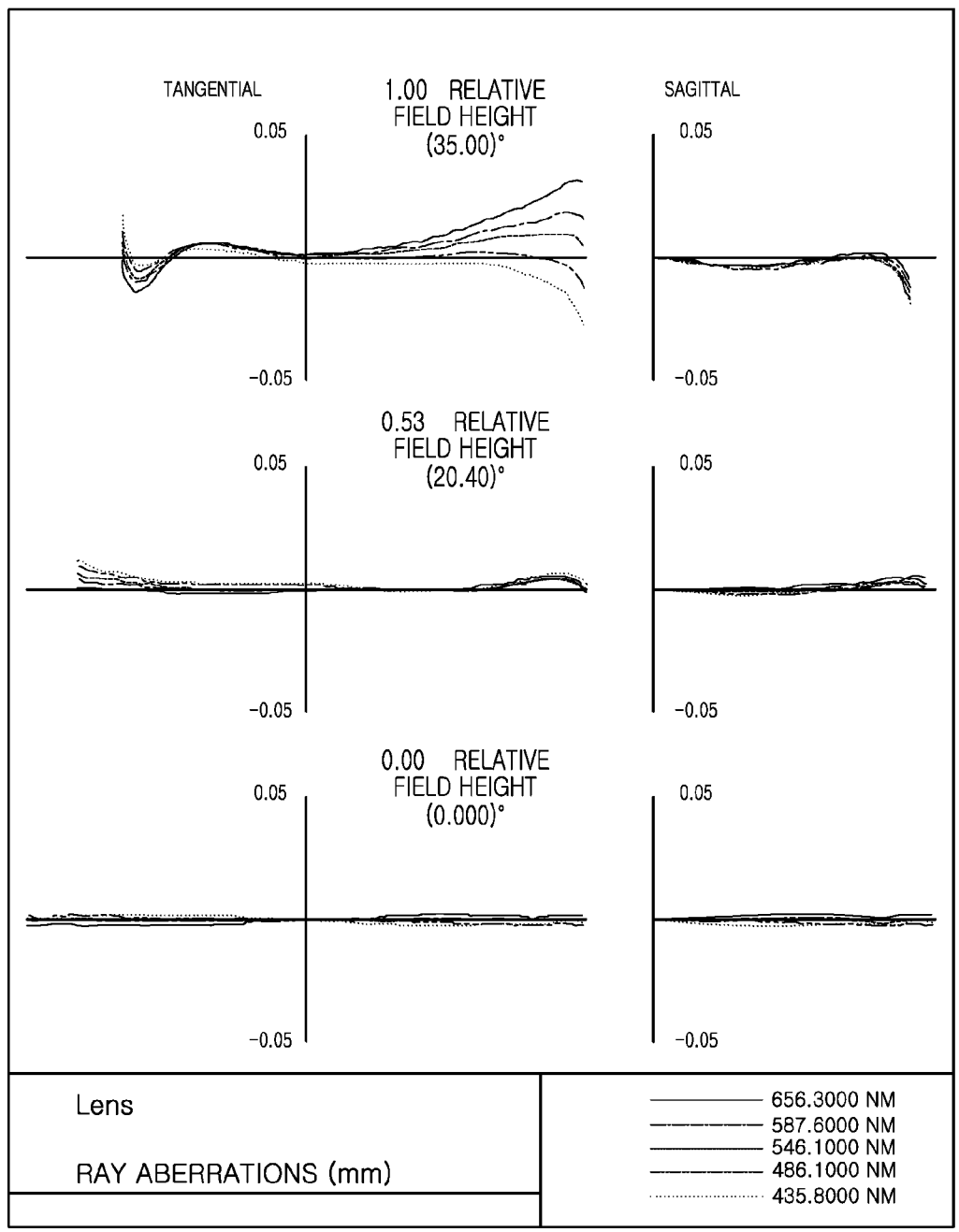
FIG. 12 is graphs illustrating coma aberration characteristics of the lens module illustrated in FIG. 10.
Figure 13:
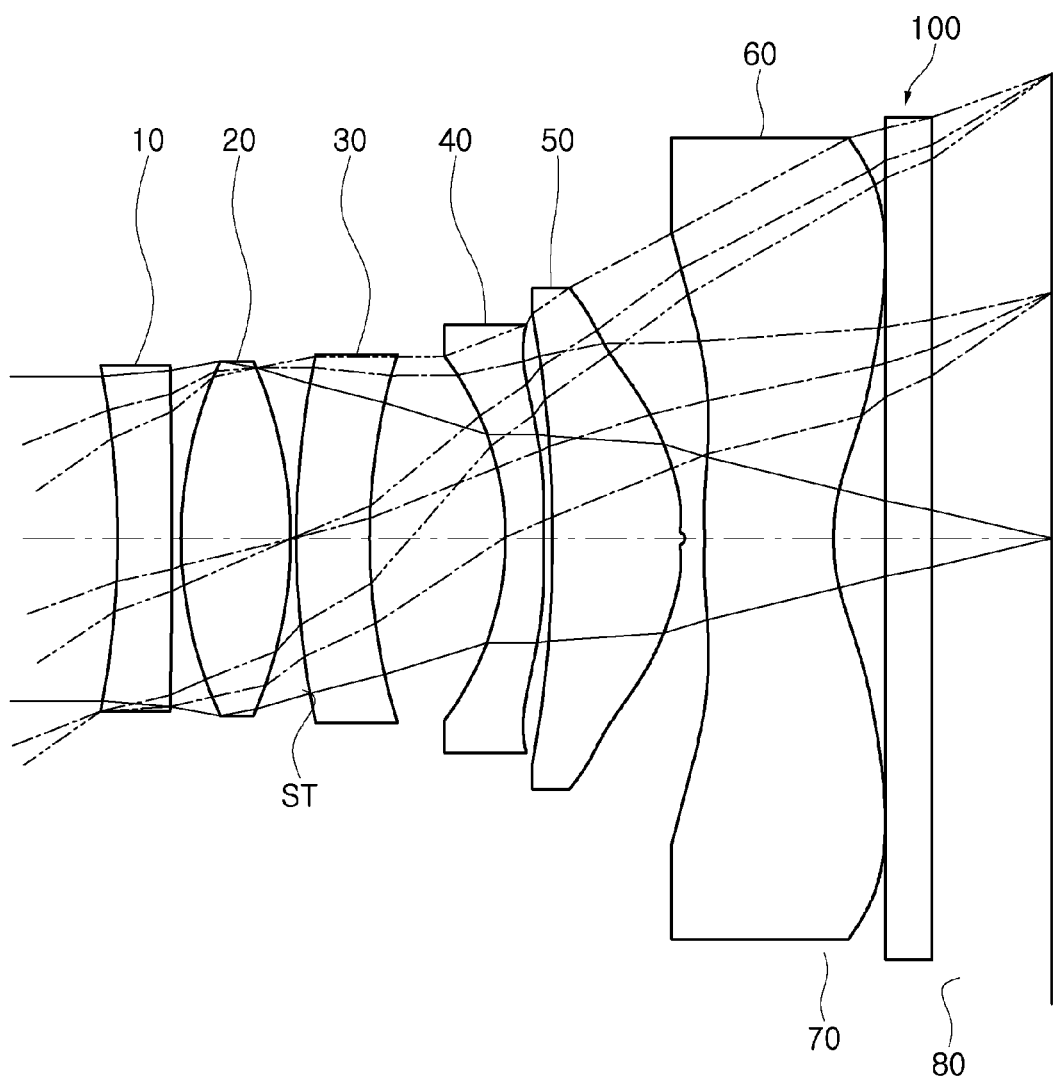
FIG. 13 is a configuration diagram of a lens module according to a fifth exemplary embodiment of the present disclosure.
Figure 14:
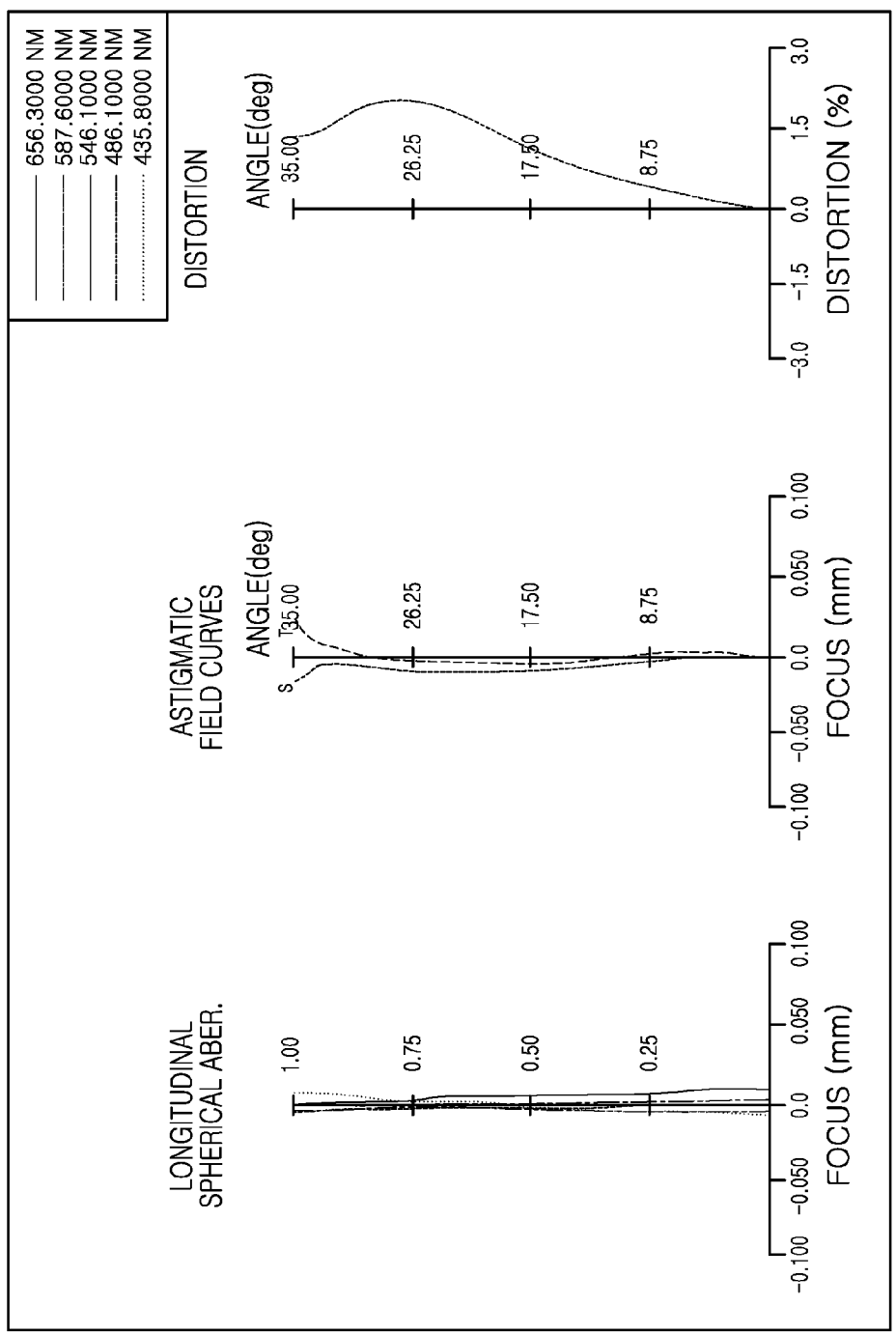
FIG. 14 is graphs illustrating aberration characteristics of the lens module illustrated in FIG. 13.
Figure 15:
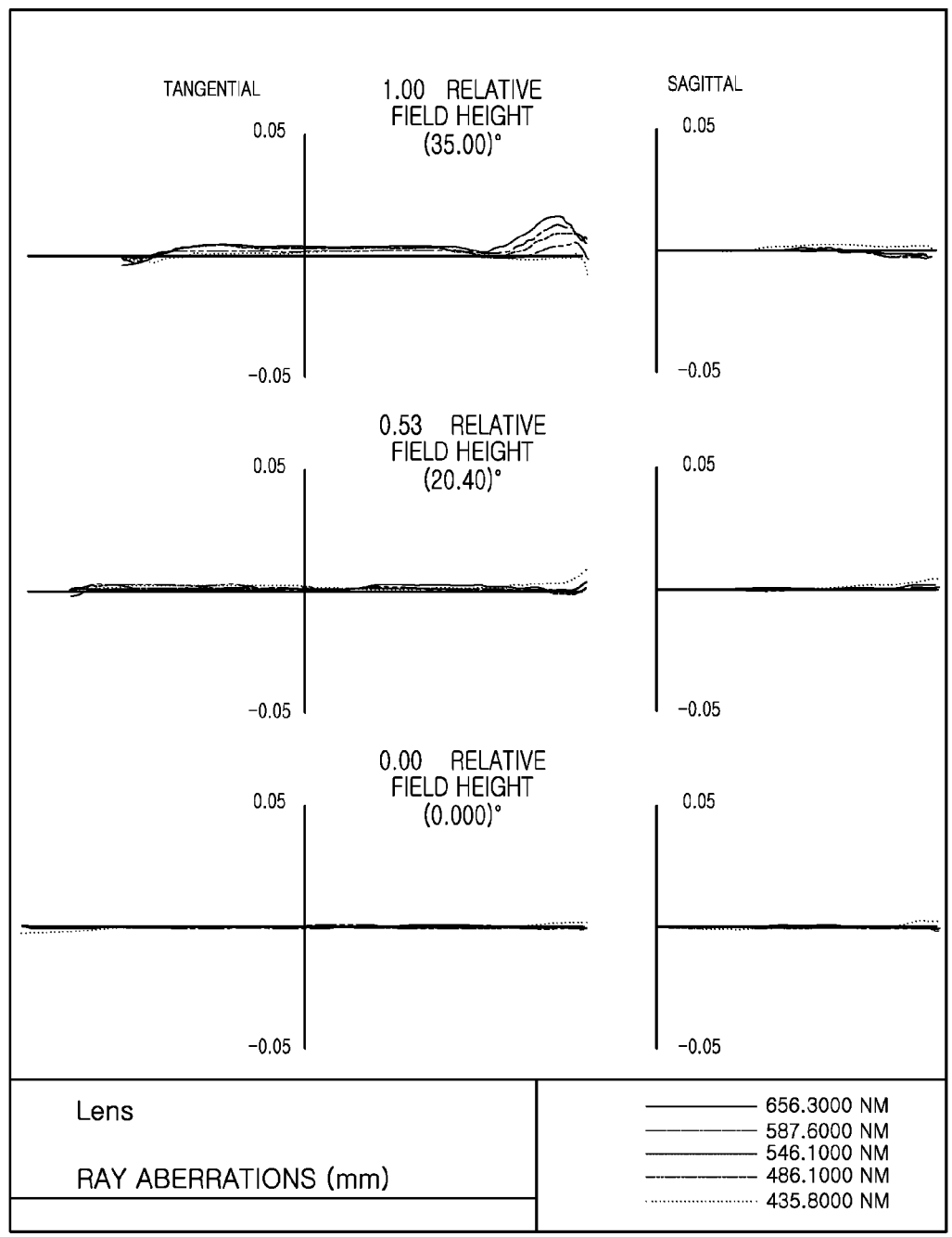
FIG. 15 is graphs illustrating coma aberration characteristics of the lens module illustrated in FIG. 13.
Figure 16:
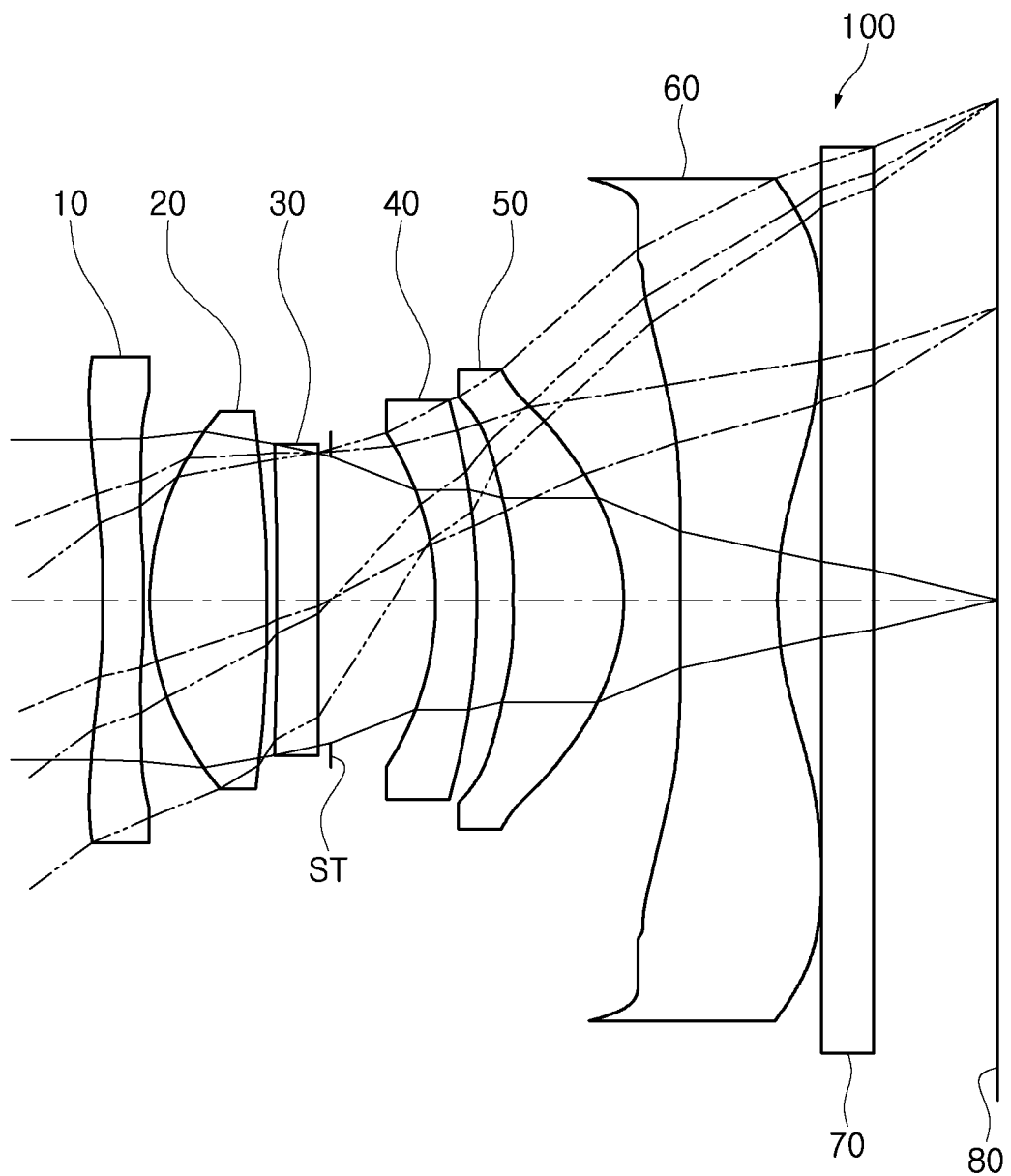
FIG. 16 is a configuration diagram of a lens module according to a sixth exemplary embodiment of the present disclosure.
Figure 17:
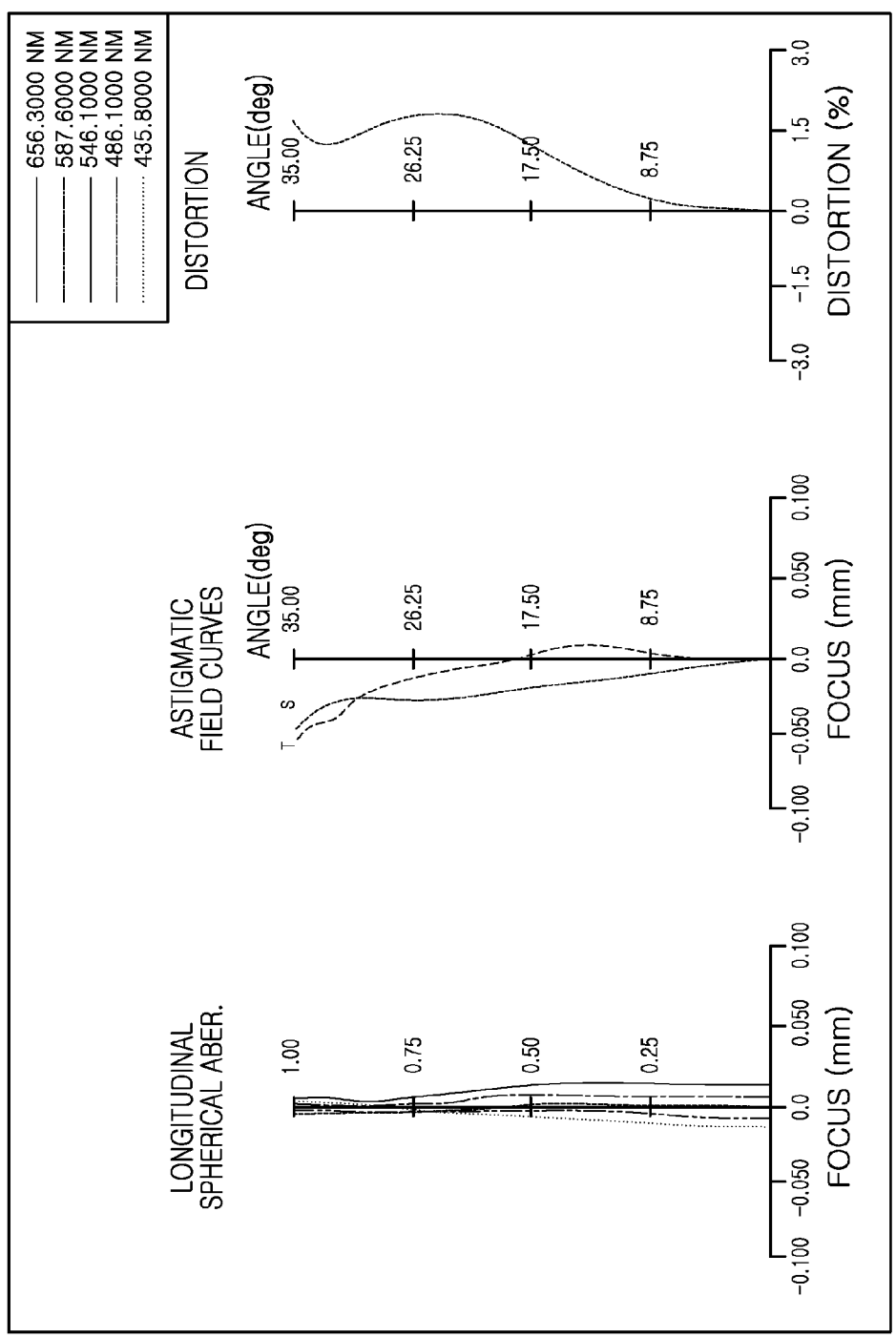
FIG. 17 is graphs illustrating aberration characteristics of the lens module illustrated in FIG. 16.
Figure 18:
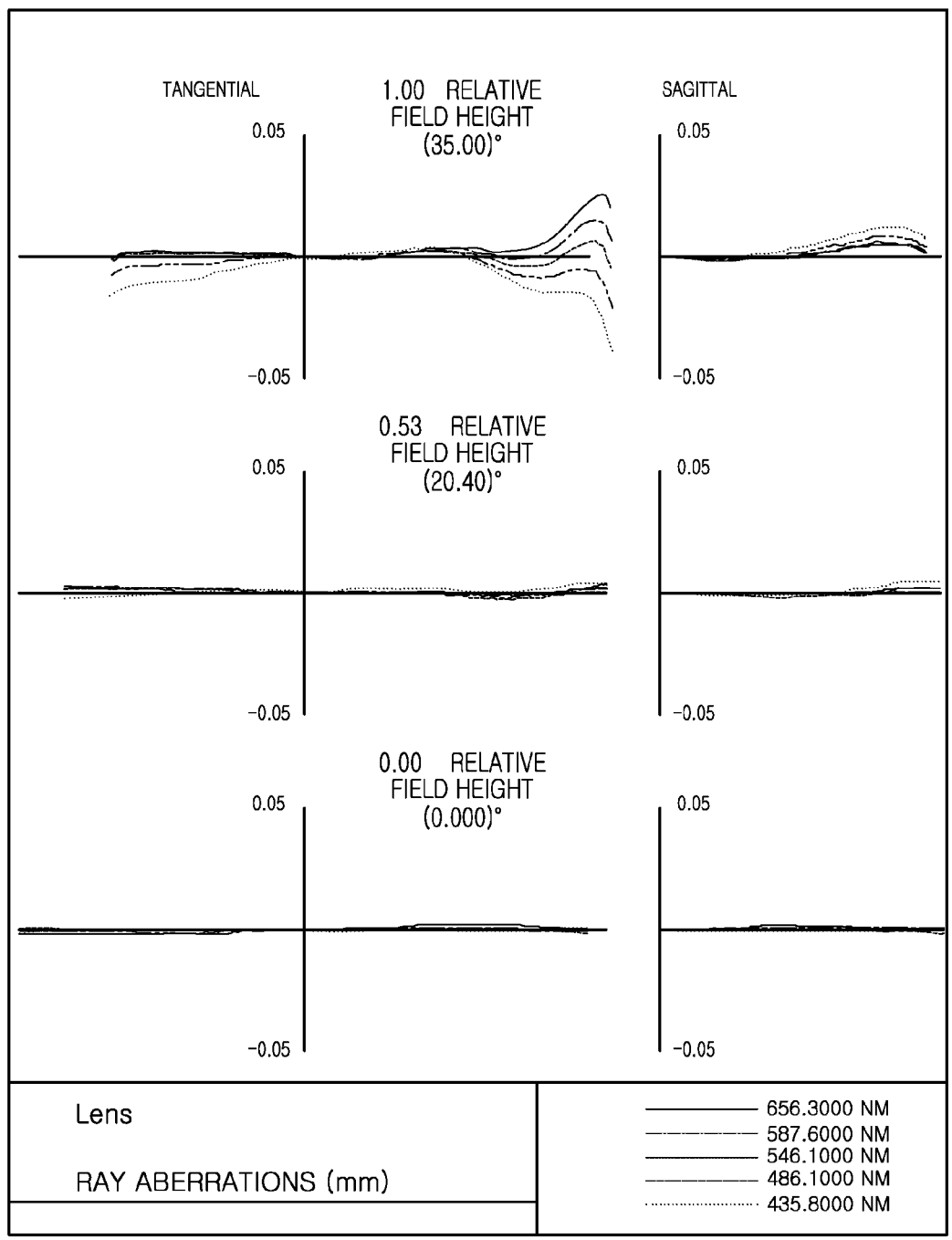
FIG. 18 is graphs illustrating coma aberration characteristics of the lens module illustrated in FIG. 16.

FIG. 1 is a configuration diagram of a lens module according to an exemplary embodiment of the present disclosure; FIG. 2 is graphs illustrating aberration characteristics of the lens module illustrated in FIG. 1; FIG. 3 is graphs illustrating coma aberration characteristics of the lens module illustrated in FIG. 1; FIG. 4 is a configuration diagram of a lens module according to a second exemplary embodiment of the present disclosure; FIG. 5 is graphs illustrating aberration characteristics of the lens module illustrated in FIG. 4; FIG. 6 is graphs illustrating coma aberration characteristics of the lens module illustrated in FIG. 4; FIG. 7 is a configuration diagram of a lens module according to a third exemplary embodiment of the present disclosure; FIG. 8 is a curve illustrating aberration characteristics of the lens module illustrated in FIG. 7; FIG. 9 is graphs illustrating coma aberration characteristics of the lens module illustrated in FIG. 7; FIG. 10 is a configuration diagram of a lens module according to a fourth exemplary embodiment of the present disclosure; FIG. 11 is graphs illustrating aberration characteristics of the lens module illustrated in FIG. 10; FIG. 12 is graphs illustrating coma aberration characteristics of the lens module illustrated in FIG. 10; FIG. 13 is a configuration diagram of a lens module according to a fifth exemplary embodiment of the present disclosure; FIG. 14 is graphs illustrating aberration characteristics of the lens module illustrated in FIG. 13; FIG. 15 is graphs illustrating coma aberration characteristics of the lens module illustrated in FIG. 13; FIG. 16 is a configuration diagram of a lens module according to a sixth exemplary embodiment of the present disclosure; FIG. 17 is graphs illustrating aberration characteristics of the lens module illustrated in FIG. 16; and FIG. 18 is graphs illustrating coma aberration characteristics of the lens module illustrated in FIG. 16.

A lens module according to an exemplary embodiment of the present disclosure may include an optical system including six lenses. In detail, the lens module may include a first lens, a second lens, a third lens, a fourth lens, a fifth lens, and a sixth lens. However, the lens module is not limited thereto, and may include further components if necessary. For example, the lens module may include a stop for controlling an amount of light. In addition, the lens module may further include an infrared cut-off filter cutting off an infrared ray. Further, the lens module may further include an image sensor converting an image of a subject incident through the optical system into an electrical signal. Further, the lens module may further include an interval maintaining member adjusting an interval between lenses.

The first to sixth lenses configuring the optical system may be formed of plastic. In addition, at least one of the first to sixth lenses may have an aspherical surface. Further, the first to sixth lenses may have at least one aspherical surface. That is, at least one of first and second surfaces of the first to sixth lenses may be aspherical.

In addition, the optical system including the first to sixth lenses may have an F No. of 2.2 or less. In this case, the subject may be clearly imaged. For example, the lens module according to the present disclosure may clearly image an image of the subject even under a low illumination condition (for example, 100 lux or less).

In addition, the optical system according to the present disclosure may satisfy Conditional Equation 1.

$$TTL/IMGH<2 \qquad \text{[Conditional Equation 1]}$$

Here, TTL is a distance from an object-side surface of the first lens to an imaging surface, and IMGH is a length of the imaging surface.

The optical system satisfying Conditional Equation 1 may be advantageous for miniaturization of the lens module. That is, it may be easily for a lens module satisfying Conditional Equation 1 to be mounted in a mobile communications terminal, but it may be difficult for a lens module exceeding an upper limit of Conditional Equation 1 to be mounted in the mobile communication terminal.

In addition, the optical system according to the present disclosure may satisfy Conditional Equation 2.

$$0.5 < SL/TTL < 1.1 \quad \text{[Conditional Equation 2]}$$

Here, SL is a distance from the stop to the imaging surface, and TTL is the distance from the object-side surface of the first lens to the imaging surface.

In detail, the stop may be disposed at any place of the optical system in a range satisfying Conditional Equation 2. For example, the stop may be disposed in front of the first lens or be disposed in front of the fourth lens. For reference, a numeral range of Conditional Equation 2 may be a range significantly decreasing distortion of the optical system.

In addition, the optical system according to the present disclosure may satisfy Conditional Equation 3.

$$ANG/F \text{ No.} > 34 \quad \text{[Conditional Equation 3]}$$

Here, ANG is a viewing angle of the object.

An optical system satisfying Conditional Equation 3 may be effective to implement a small lens module having high resolution. In addition, Conditional Equation 3 may be a numeral limitation for significantly decreasing aberration correction. That is, an optical system having ANG/F No. less than a lower limit of Conditional Equation 3 may have many design conditions for aberration correction.

Next, the first to sixth lenses configuring the optical system will be described.

The first lens may have negative refractive power, and a first surface or a second surface thereof may be convex. For example, the second surface of the first lens may be convex toward the image. The first lens may be larger than the second lens. In detail, an effective region (region in which light refraction substantially occurs) of the first lens may be larger than that of the second lens. However, the effective region of the first lens is not necessarily larger than that of the second lens, but may be equal to or smaller than that of the second lens if necessary. At least one of the first and second surfaces of the first lens may be aspherical. For example, both surfaces of the first lens may be aspherical.

The second lens may have positive refractive power, and at least one of first and second surfaces thereof may be convex. For example, the first surface or the second surface of the second lens may be convex or both of the first and second surfaces of the second lens may be convex. At least one of the first and second surfaces of the second lens may be aspherical. For example, both surfaces of the second lens may be aspherical.

The third lens may have positive or negative refractive power. For example, the third lens may have positive refractive power or have negative refractive power. Here, the refractive power of the third lens may be changed depending on a shape of the second lens or a shape of the fourth lens. Alternatively, the refractive power of the third lens may be changed depending on a shape of a first surface of the third lens. A second surface of the third lens may be concave. This shape of the third lens may be advantageous for converging refracted light from the second lens on the fourth lens. At least one of the first and second surfaces of the third lens may be aspherical. For example, both surfaces of the third lens may be aspherical.

The fourth lens may have positive or negative refractive power. For example, the fourth lens may have positive refractive power or have negative refractive power. Alternatively, the refractive power of the fourth lens may be changed depending on a shape of a first surface of the fourth lens. For example, in the case in which the first surface of the fourth lens is concave, the fourth lens may have negative refractive power. Unlike this, in the case in which the first surface of the fourth lens is convex, the fourth lens may have positive refractive power. At least one of the first and second surfaces of the fourth lens may be aspherical. For example, both surfaces of the fourth lens may be aspherical.

The fifth lens may have positive refractive power. However, refractive power of the fifth lens is not limited to positive refractive power. For example, the fifth lens may have negative refractive power if necessary. A first surface of the fifth lens may be concave and a second surface thereof may be convex. In detail, the fifth lens may have a meniscus shape in which it is convex toward the image. However, the fifth lens is not limited to having a meniscus shape, and may have another shape. At least one of the first and second surfaces of the fifth lens may be aspherical. For example, both surfaces of the fifth lens may be aspherical.

The sixth lens may have negative refractive power. However, refractive power of the sixth lens is not limited to negative refractive power. For example, the refractive power of the sixth lens may be changed to positive refractive power depending on the refractive power of the fifth lens. A first surface of the sixth lens may be convex and a second surface thereof may be concave. In addition, the sixth lens may have an inflection point formed on at least one of the first and second surfaces thereof. For example, the second surface of the sixth lens may be concave at the center of an optical axis and become convex toward an edge thereof. In addition, at least one of the first and second surfaces of the sixth lens may be aspherical. For example, both surfaces of the sixth lens may be aspherical.

Meanwhile, in the optical system according to an exemplary embodiment of the present disclosure, the first to sixth lenses may be disposed so that effective areas thereof are reduced in size from the first lens toward the third lens and increased in size from the fourth lens toward the sixth lens. The optical system configured as described above may increase an amount of light incident on the image sensor to increase resolution of the lens module.

The lens module configured as described above may significantly decrease aberration, which causes image quality deterioration, and may improve resolution. In addition, the lens module configured as described above may be easy for lightness and be advantageous for decreasing manufacturing costs.

A lens module according to a first exemplary embodiment of the present disclosure will be described with reference to FIGS. 1 through 3.

A lens module 100 according to a first exemplary embodiment of the present disclosure may include an optical system including a first lens 10, a second lens 20, a third lens 30, a fourth lens 40, a fifth lens 50, and a sixth lens 60, and may further include an infrared cut-off filter 70, an image sensor 80, and a stop ST.

Here, a distance (TTL) from a first surface of the first lens 10 to a first surface (imaging surface) of the image sensor 80 may be 6.00 mm, a length (IMGH) of the imaging surface of the image sensor 80 may be 6.10 mm, and a distance (SL) from the stop ST to the imaging surface may be 4.33 mm. In addition, a viewing angle (ANG) of the optical system may be 70.00 degrees, and an F No. thereof may be 1.85. The lens module 100 configured as described above may satisfy all of Conditional Equations 1 to 3 (please see Table 7).

TABLE 1

|  | RDY | THI | GLA |
|---|---|---|---|
| OBJ: | INFINITY | INFINITY | |
| 0: | INFINITY | 0.000000 | |
| 1: | −3.36593 | 0.381841 | 638100.233700 |
| K: | −0.982787 | | |
| A: −.320043E−02 | B: 0.959577E−02 | C: −.279596E−02 | D: 0.210869E−03 |
| 2: | −5.61779 | 0.050000 | |
| K: | 0.100000 | | |
| A: 0.118194E−01 | B: 0.302010E−02 | C: 0.229020E−02 | D: −.940914E−03 |
| 3: | 2.60000 | 0.721763 | 544100.560900 |
| K: | −2.312559 | | |
| A: 0.210655E−01 | B: .117262E−01 | C: 0.223978E−02 | D: −.232843E−04 |
| 4: | −9.00571 | 0.050000 | |
| K: | 1.000000 | | |
| A: −.201551E−01 | B: −.124602E−02 | C: 0.335748E−02 | D: −.326619E−03 |
| 5: | 3.28820 | 0.415254 | 5.44100.560900 |
| K: | 1.948602 | | |
| A: −1.49909E−01 | B: 0.162145E−02 | C: −.163426E−02 | D: 0.604857E−02 |
| E: −.177089E02 | | | |
| 6: | 7.08359 | 0.050000 | |
| K: | −1.000000 | | |
| A: −.100000E−01 | B: −.100000E−01 | C: −.100000E−01 | D: −.100000E−01 |
| E: −.258919E−02 | | | |
| STO: | INFINITY | 0.713444 | |
| 7: | −1.95470 | 0.250000 | 638100.233700 |
| K: | 0.732649 | | |
| A: −.100000E−01 | B: 0.210090E−02 | C: 0.474877E−02 | D: 0.100000E−01 |
| E: −.264152E−02 | | | |
| 8: | −4.31191 | 0.391401 | |
| K: | −2.683285 | | |
| A: 0.895882E−02 | B: 0.453739E−03 | C: 0.375199E−02 | D: 0.000000E+00 |
| 9: | −2.86969 | 0.712957 | 544100.560900 |
| K: | 3.000000 | | |
| A: 0.515161E−02 | B: −.100000E−01 | C: −.100000E−01 | D: 0.133045E−02 |
| E: 0.278717E−03 | F: 0.125860E−02 | G: −.667267E−03 | |
| 10: | −1.18465 | 0.251919 | |
| K: | −0.613677 | | |
| A: 0.824110E−01 | B: −.400756E−01 | C: 0.420711E−01 | D: −.754146E−01 |
| E: 0.995782E−01 | F: −.796926E−01 | G: 0.369322E−01 | H: −.889777E−02 |
| J: 0.867075E−03 | | | |
| 11: | 12.52266 | 0.694288 | 544100.560900 |
| K: | 1.000000 | | |
| A: −.101599E+00 | B: 0.659581E−01 | C: −.354262E−01 | D: 0.133256E−01 |
| E: −.303163E−02 | F: 0.371497E−03 | G: −.187596E−04 | |
| 12: | 1.52335 | 0.267132 | |
| K: | −6.303472 | B: 0.475238E−01 | C: −.250303E−01 | D: 0.950027E−02 |
| A: −.763030E−01 | F: 0.472999E−03 | G: −.562956E−04 | H: 0.385278E−05 |
| E: −.256111E−02 | | | |
| J: −.114373E−06 | | | |
| >13: | INFINITY | 0.300000 | 516798.641983 |
| 14: | INFINITY | 0.752532 | |
| ING: | INFINITY | 0.000000 | |

In a first exemplary embodiment of the present disclosure, the first lens 10 may have negative refractive power, and the first surface thereof may be concave and a second surface thereof may be convex. The second lens 20 may have positive refractive power, and both surfaces thereof may be convex. The third lens 30 may have positive refractive power and may have a meniscus shape in which it is convex toward the object. The fourth lens 40 may have negative refractive power and may have a meniscus shape in which it is convex toward the image. The fifth lens 50 may have positive refractive power and may have a meniscus shape in which it is convex toward the image. The sixth lens 60 may have negative refractive power, and a first surface thereof may be convex and a second surface thereof may be concave. Further, the sixth lens 60 may have an inflection point formed on the second surface thereof. In addition, the stop ST may be disposed in front of the fourth lens 40.

The lens module 100 configured as described above may have improved spherical aberration and astigmatism distortion characteristics (please see FIG. 2). In addition, the lens module 100 may have improved coma aberration characteristics (please see FIG. 3).

A lens module according to a second exemplary embodiment of the present disclosure will be described with reference to FIGS. 4 through 6.

A lens module 100 according to a second exemplary embodiment of the present disclosure may include an optical system including a first lens 10, a second lens 20, a third lens 30, a fourth lens 40, a fifth lens 50, and a sixth lens 60, and may further include an infrared cut-off filter 70, an image sensor 80, and a stop ST.

Here, a distance (TTL) from a first surface of the first lens 10 to a first surface of the image sensor 80 may be 5.80 mm, a length (IMGH) of an imaging surface of the image sensor 80 may be 6.10 mm, and a distance (SL) from the stop ST to the imaging surface may be 4.35 mm. In addition, a viewing angle (ANG) of the optical system may be 70.00 degrees, and an F No. thereof may be 2.00. The lens module 100 configured as described above may satisfy all of Conditional Equations 1 to 3 (please see Table 7).

TABLE 2

| | RDY | THI | GLA |
|---|---|---|---|
| OBJ: | INFINITY | INFINITY | |
| 1: | −3.40366 | 0.350692 | 638100.233700 |
| K: | −1.000000 | | |
| A: | −.771114E−02 B: 0.910127E−02 C: −.269447E−02 D: 0.393732E−03 | | |
| 2: | −6.37273 | 0.050000 | |
| K: | 0.100000 | | |
| A: | −.207399E−02 B: 0.871829E−02 C: −.199201E−02 D: 0.572254E−03 | | |
| 3: | 2.52416 | 0.532019 | 544100.560900 |
| K: | −0.874103 | | |
| A: | 0.238853E−02 B: −.463114E−02 C: −.471498E−03 D: 0.728799E−03 | | |
| 4: | −33.56094 | 0.50000 | |
| K: | −1.000000 | | |
| A: | −.673152E−02 B: −.528574E−03 C: −.239939E−02 D: 0.902220E−03 | | |
| 5: | 3.00846 | 0.441836 | 544100.560900 |
| K: | 2.497740 | | |
| A: | −.169841E−02 B: 0.768592E−02 C: −.449951E−02 D: 0.341487E−02 | | |
| E: | −.295889E−02 | | |
| 6: | 24.80532 | 0.50000 | |
| K: | −1.000000 | | |
| A: | −.100000E−02 B: −.100000E−02 C: −100000E−02 D: −100000E−02 | | |
| E: | −.100000E−02 | | |
| STO: | INFINITY | 0.655283 | |
| 7: | −2.24650 | 0.250000 | 638100.233700 |
| K: | 0.722109 | | |
| A: | −0.898939E−02 B: 0.100000E−01 C: 0.100000E−01 D: −.628763E−02 | | |
| E: | 0.549737E−02 | | |
| 8: | −5.58651 | 0.499749 | |
| K: | −1.197883 | | |
| A: | 0.165681E−01 B: 0.961152E−02 C: −.248095E−02 D: 0.000000E+00 | | |
| 9: | −2.43616 | 0.662912 | 544100.560900 |
| K: | 3.000000 | | |
| A: | 0.675978E−02 B: −.100000E−01 C: −.517697E−02 D: −.713705E−02 | | |
| E: | 0.144097E−01 F: −.384086E−02 G: 0.165569E−04 | | |
| 10: | −1.15332 | 0.258688 | |
| K: | −0.727117 | | |
| A: | 0.781477E−01 B: −.523430E−01 C: 0.505007E−01 D: −.791136E−01 | | |
| E: | 0.987200E−01 F: −.789504E−01 G: 0.374380E−01 H: −.911654E−02 | | |
| J: | 0.867075E−03 | | |
| 11: | 24.95292 | 0.706716 | 544100.560900 |
| K: | −1.000000 | | |
| A: | −.100166E+00 B: 0.666246E−01 C: −.353695E−01 D: 0.133415E−01 | | |
| E: | −.303356E−02 F: 0.369980E−03 G: −.186403E−04 | | |
| 12: | 1.56393 | 0.242105 | |
| K: | −6.831763 | | |
| A: | −.783651E−01 B: 0.483222E−01 C: −.252446E−01 D: 0.952820E−02 | | |
| E: | −.256276E−02 F: 0.473083E−03 G: −.562607E−04 H: 0.384733E−05 | | |
| J: | −.114373E−06 | | |
| 13: | INFINITY | 0.300000 | 516798.641983 |
| 14: | INFINITY | 0.752774 | |
| ING: | INFINITY | 0.000000 | |

In a second exemplary embodiment of the present disclosure, the first lens 10 may have negative refractive power, and the first surface thereof may be concave and a second surface thereof may be convex. The second lens 20 may have positive refractive power, and both surfaces thereof may be convex. The third lens 30 may have positive refractive power and may have a meniscus shape in which it is convex toward the object. The fourth lens 40 may have negative refractive power, and a first surface thereof may be concave and a second surface thereof may be convex. The fifth lens 50 may have positive refractive power and may have a meniscus shape in which it is convex toward the image. The sixth lens 60 may have negative refractive power, and a first surface thereof may be convex and a second surface thereof may be concave. Further, the sixth lens 60 may have an inflection point formed on the second surface thereof. In addition, the stop ST may be disposed in front of the fourth lens 40.

The lens module 100 configured as described above may have improved spherical aberration and astigmatism distortion characteristics (please see FIG. 5). In addition, the lens module 100 may have improved coma aberration characteristics (please see FIG. 6).

A lens module according to a third exemplary embodiment of the present disclosure will be described with reference to FIGS. 7 through 9.

A lens module 100 according to a third embodiment of the present disclosure may include an optical system including a first lens 10, a second lens 20, a third lens 30, a fourth lens 40, a fifth lens 50, and a sixth lens 60, and may further include an infrared cut-off filter 70, and an image sensor 80.

Here, a distance (TTL) from a first surface of the first lens 10 to a first surface of the image sensor 80 may be 5.30 mm, a length (IMGH) of an imaging surface of the image sensor 80 may be 6.10 mm, and a distance (SL) from the stop ST to the imaging surface may be 5.30 mm. In addition, a viewing angle (ANG) of the optical system may be 70.00 degrees, and an F No. thereof may be 1.85. The lens module 100 configured as described above may satisfy all of Conditional Equations 1 to 3 (please see Table 7).

TABLE 3

| | RDY | THI | GLA | | | | |
|---|---|---|---|---|---|---|---|
| OBJ: | INFINITY | INFINITY | | | | | |
| STO: | | | | | | | |
| 1: | 2.37154 | 0.284855 | 632000.234000 | | | | |
| K: | −1.000000 | | | | | | |
| A: | −.100000E−01 | B: −.286293E−02 | | | | | |
| 2: | 2.13106 | 0.100000 | | | | | |
| K: | −0.848576 | | | | | | |
| A: | −.441919E−01 | B: 0.108942E−01 | C: 0.000000E+00 | D: 0.000000E+00 | | | |
| 3: | 1.61622 | 0.785561 | 544100.560900 | | | | |
| K: | −1.784706 | | | | | | |
| A: | 0.177693E−01 | B: 0.922670E−02 | C: 0.549414E−02 | D: −.333368E−02 | | | |
| 4: | −9.23899 | 0.050000 | | | | | |
| K: | 1.000000 | | | | | | |
| A: | −.468404E−02 | B: −.194253E−01 | C: 0.101146E−01 | D: −.103959E−02 | | | |
| 5: | 206.55840 | 0.250000 | 632000.234000 | | | | |
| K: | 5.000000 | | | | | | |
| A: | −.686710E−01 | B: 0.741993E−01 | C: −.563333E−01 | D: 0.293523E−01 | | | |
| E: | −.531791E−02 | | | | | | |
| 6: | 2.61176 | 0.422673 | | | | | |
| K: | −0.710884 | | | | | | |
| A: | −.601560E−01 | B: 0.105816E+00 | C: −.432180E−01 | D: 0.186446E−02 | | | |
| E: | 0.133729E−01 | | | | | | |
| 7: | 35.50190 | 0.374129 | 632000.234000 | | | | |
| K: | −3.000000 | | | | | | |
| A: | −.963243E−01 | B: −.891619E−01 | C: 0.162990E+00 | D: −.115285E+00 | | | |
| E: | 0.397359E−01 | | | | | | |
| 8: | −18.90181 | 0.308807 | | | | | |
| K: | −3.000000 | | | | | | |
| A: | −.479873E−01 | B: −.167924E+00 | C: 0.190037E+00 | D: −.768393E−01 | | | |
| E: | 0.756554E−02 | F: −.158530E−02 | G: 0.275733E−02 | | | | |
| 9: | −3.31757 | 0.581134 | 544100.560900 | | | | |
| K: | 2.985426 | | | | | | |
| A: | 0.144325E+00 | B: −.238631E+00 | C: 0.132846E+00 | D: 0.597961E−01 | | | |
| E: | −.102749E+00 | F: 0.430322E−01 | G: −.682045E−02 | | | | |
| 10: | −1.47179 | 0.243237 | | | | | |
| K: | −0.310914 | | | | | | |
| A: | 0.169551E+00 | B: −.121814E+00 | C: 0.731445E−01 | D: −.182148E−01 | | | |
| E: | 0.207287E−01 | F: −.238570E−01 | G: 0.109280E−01 | H: −.215455E−02 | | | |
| J: | 0.151498E−03 | | | | | | |
| 11: | 4.15071 | 0.585043 | 544100.560900 | | | | |
| K: | 0.209179 | | | | | | |
| A: | −.196716E+00 | B: 0.792137E−01 | C: −.158040E−01 | D: 0.173404E−02 | | | |
| E: | −.855821E−04 | | | | | | |
| 12: | 1.22486 | 0.264561 | | | | | |
| K: | −5.45911 | | | | | | |
| A: | −.100352E+00 | B: 0.533169E−01 | C: −.231624E−01 | D: 0.752216E−02 | | | |
| E: | −.178129E−02 | F: 0.297195E−03 | G: −.329778E−04 | H: 0.221068E−05 | | | |
| J: | −.687160E−07 | | | | | | |
| >13: | INFINITY | 0.300000 | 516798.641983 | | | | |
| 14: | INFINITY | 0.762454 | | | | | |
| ING: | INFINITY | −0.013676 | | | | | |

In a third exemplary embodiment of the present disclosure, the first lens 10 may have negative refractive power, and the first surface thereof may be convex and a second surface thereof may be concave. The second lens 20 may have positive refractive power, and both surfaces thereof may be convex. The third lens 30 may have negative refractive power, and a first surface thereof may be convex and a second surface thereof may be concave. The fourth lens 40 may have positive refractive power, and a first surface thereof may be concave and a second surface thereof may be convex. The fifth lens 50 may have positive refractive power and may have a meniscus shape in which it is convex toward the image. The sixth lens 60 may have negative refractive power, and a first surface thereof may be convex and a second surface thereof may be concave. Further, the sixth lens 60 may have an inflection point formed on the second surface thereof. In addition, the stop ST may be disposed in front of the first lens 10 or may be omitted.

The lens module 100 configured as described above may have improved spherical aberration and astigmatism distortion characteristics (please see FIG. 8). In addition, the lens module 100 may have improved coma aberration characteristics (please see FIG. 9).

A lens module according to a fourth exemplary embodiment of the present disclosure will be described with reference to FIGS. 10 through 12.

A lens module 100 according to a fourth exemplary embodiment of the present disclosure may include an optical system including a first lens 10, a second lens 20, a third lens 30, a fourth lens 40, a fifth lens 50, and a sixth lens 60, and may further include an infrared cut-off filter 70, an image sensor 80, and a stop ST.

Here, a distance (TTL) from a first surface of the first lens 10 to a first surface of the image sensor 80 may be 5.40 mm, a length (IMGH) of an imaging surface of the image sensor 80 may be 6.10 mm, and a distance (SL) from the stop ST to the imaging surface may be 3.97 mm. In addition, a viewing angle (ANG) of the optical system may be 70.00 degrees, and an F No. thereof may be 1.95. The lens module 100 configured as described above may satisfy all of Conditional Equations 1 to 3 (please see Table 7).

TABLE 4

| | | RDY | | THI | | GLA | | |
|---|---|---|---|---|---|---|---|---|
| OBJ: | | INFINITY | | INFINITY | | | | |
| 1: | | −32.00000 | | 0.250000 | | 638100.233700 | | |
| | K: | 1.000000 | | | | | | |
| | A: | −.107482E−01 | B: 0.956709E−02 | C: | −.247595E−02 | D: | −.109127E−03 | |
| 2: | | 25.72296 | | 0.064172 | | | | |
| | K: | −0.100000 | | | | | | |
| | A: | 0.384635E−02 | B: 0.947787E−02 | C: | −.173472E−02 | D: | −.125763E−02 | |
| 3: | | 2.59999 | | 0.492172 | | 544100.560900 | | |
| | K: | −1.583108 | | | | | | |
| | A: | −.100000E−02 | B: −.100000E−02 | C: | −.100000E−02 | D: | −.100000E−02 | |
| 4: | | 17.53200 | | 0.050000 | | | | |
| | K: | 1.000000 | | | | | | |
| | A: | −.129294E−01 | B: 0.142815E−02 | C: | −.136866E−02 | D: | 0.152014E−02 | |
| 5: | | 2.48582 | | 0.519112 | | 544100.560900 | | |
| | K: | 2.563079 | | | | | | |
| | A: | 0.205294E−01 | B: 0.606171E−03 | C: | −.487899E−02 | D: | 0.582489E−02 | |
| | E: | −.160626E−02 | | | | | | |
| 6: | | 8.56425 | | 0.050000 | | | | |
| | K: | 1.000000 | | | | | | |
| | A: | 0.546837E−02 | B: −.972465E−02 | C: | −.100000E−01 | D: | 0.434306E−02 | |
| | E: | −.241752E−03 | | | | | | |
| STO: | | INFINITY | | 0.559137 | | | | |
| 7: | | −1.84441 | | 0.250000 | | 638100.233700 | | |
| | K: | 0.757670 | | | | | | |
| | A: | −.100000E−01 | B: 0.100000E−01 | C: | 0.100000E−01 | D: | 0.618867E−01 | |
| | E: | −.906336E−03 | | | | | | |
| 8: | | −2.95575 | | 0.372740 | | | | |
| | K: | −0.328721 | | | | | | |
| | A: | 0.118155E−01 | B: 0.733058E−02 | C: | 0.675870E−02 | D: | 0.000000E+00 | |
| 9: | | −2.24570 | | 0.535860 | | 544100.560900 | | |
| | K: | 3.000000 | | | | | | |
| | A: | 0.100000E−01 | B: 0.940808E−02 | C: | −.993624E−02 | D: | −.311567E−02 | |
| | E: | 0.165158E−01 | F: −.507207E−02 | G: | 0.165569E−04 | | | |
| 10: | | −1.11955 | | 0.452438 | | | | |
| | K: | −0.812239 | | | | | | |
| | A: | 0.989167E−01 | B: −.661886E−01 | C: | 0.539618E−01 | D: | −.726239E−01 | |
| | E: | 0.100000E+00 | F: −.794810E−01 | G: | 0.370090E−01 | H: | −.920894E−02 | |
| | J: | 0.867075E−03 | | | | | | |
| 11: | | 14.98061 | | 0.374817 | | 544100.560900 | | |
| | K: | −1.000000 | | | | | | |
| | A: | −.109972E+00 | B: 0.675545E−01 | C: | −.349845E−01 | D: | 0.133474E−01 | |
| | E: | −.304523E−02 | F: 0.368028E−03 | G: | −.182519E−04 | | | |
| 12: | | 1.52327 | | 0.312119 | | | | |
| | K: | −7.413428 | | | | | | |
| | A: | −.886182E−01 | B: 0.491318E−01 | C: | −.254304E−01 | D: | 0.952882E−02 | |
| | E: | −.255852E−02 | F: 0.473691E−03 | G: | −.562557E−04 | H: | 0.382787E−05 | |
| | J: | −.114373E−06 | | | | | | |
| 13: | | INFINITY | | 0.300000 | | 516798.641983 | | |
| 14: | | INFINITY | | 0.819447 | | | | |
| ING: | | INFINITY | | 0.000000 | | | | |

In a fourth exemplary embodiment of the present disclosure, the first lens 10 may have negative refractive power, and the first surface thereof may be concave and a second surface thereof may be concave. The second lens 20 may have positive refractive power, and both surfaces thereof may be convex. The third lens 30 may have positive refractive power, and a first surface thereof may be convex and a second surface thereof may be concave. The fourth lens 40 may have negative refractive power, and a first surface thereof may be concave and a second surface thereof may be convex. The fifth lens 50 may have positive refractive power and may have a meniscus shape in which it is convex toward the image. The sixth lens 60 may have negative refractive power, and a first surface thereof may be convex and a second surface thereof may be concave. Further, the sixth lens 60 may have an inflection point formed on the second surface thereof. In addition, the stop ST may be disposed in front of the fourth lens 40.

The lens module 100 configured as described above may have improved spherical aberration and astigmatism distortion characteristics (please see FIG. 11). In addition, the lens module 100 may have improved coma aberration characteristics (please see FIG. 12).

A lens module according to a fifth exemplary embodiment of the present disclosure will be described with reference to FIGS. 13 through 15.

A lens module 100 according to a fifth exemplary embodiment of the present disclosure may include an optical system including a first lens 10, a second lens 20, a third lens 30, a fourth lens 40, a fifth lens 50, and a sixth lens 60, and may further include an infrared cut-off filter 70, an image sensor 80, and a stop ST.

Here, a distance (TTL) from a first surface of the first lens 10 to a first surface of the image sensor 80 may be 6.08 mm, a length (IMGH) of an imaging surface of the image sensor 80 may be 6.10 mm, and a distance (SL) from the stop ST to the imaging surface may be 4.95 mm. In addition, a viewing angle (ANG) of the optical system may be 70.00 degrees, and an F No. thereof may be 2.00. The lens module 100 configured as described above may satisfy all of Conditional Equations 1 to 3 (please see Table 7).

TABLE 5

|  |  | RDY | | THI | | GLA |  |  |
|---|---|---|---|---|---|---|---|---|
| OBJ: |  | INFINITY | | INFINITY | | | | |
| 1: |  | −6.54800 | | 0.349202 | | 632000.234000 | | |
|  | K: | −1.000000 | | | | | | |
|  | A: | −.130943E−01 | B: | 0.967360E−02 | C: | −.375126E−02 | D: | −.313069E−03 |
| 2: |  | −17.70344 | | 0.071092 | | | | |
|  | K: | 0.526874 | | | | | | |
|  | A: | 0.143208E−01 | B: | 0.968594E−03 | C: | 0.302472E−02 | D: | −.122653E−02 |
| 3: |  | 2.62095 | | 0.710063 | | 544100.560900 | | |
|  | K: | −2.766833 | | | | | | |
|  | A: | 0.308523E−01 | B: | −.189373E−01 | C: | 0.272185E−03 | D: | 0.590926E−03 |
| STO: | | | | | | | | |
| 4: |  | −3.22568 | | 0.050000 | | | | |
|  | K: | −0.635638 | | | | | | |
|  | A: | −.272291E−02 | B: | −.186602E−01 | C: | 0.115520E−01 | D: | −.292777E−02 |
| 5: |  | 6.61876 | | 0.468114 | | 544100.560900 | | |
|  | K: | −2.426435 | | | | | | |
|  | A: | −.204818E−01 | B: | −.602795E−02 | C: | 0.122771E−01 | D: | 0.623215E−02 |
|  | E: | −.424995E−02 | | | | | | |
| 6: |  | 3.01650 | | 0.870014 | | | | |
|  | K: | −1.000000 | | | | | | |
|  | A: | −.339557E−01 | B: | 0.156964E−01 | C: | −.257493E−01 | D: | 0.357014E−01 |
|  | E: | −.161706E−01 | | | | | | |
| 7: |  | −2.14243 | | 0.261602 | | 632000.234000 | | |
|  | K: | −0.382239 | | | | | | |
|  | A: | −.753387E−01 | B: | 0.817836E−01 | C: | −.815630E−01 | D: | 0.832248E−01 |
|  | E: | −.324429E−01 | | | | | | |
| 8: |  | −5.60695 | | 0.050000 | | | | |
|  | K: | 2.151291 | | | | | | |
|  | A: | −.762431E−01 | B: | 0.921568E−01 | C: | −.784106E−01 | D: | 0.359138E−01 |
|  | E: | 0.260723E−01 | F: | −.273850E−01 | G: | 0.615529E−02 | | |
| 9: |  | −7.91362 | | 0.851735 | | 544100.560900 | | |
|  | K: | 3.000000 | | | | | | |
|  | A: | 0.296163E−02 | B: | −.999998E−02 | C: | −.985177E−02 | D: | 0.786962E−02 |
|  | E: | 0.103536E−01 | F: | −.798549E−02 | G: | 0.135596E−02 | | |
| 10: |  | −1.38584 | | 0.142414 | | | | |
|  | K: | −0.422272 | | | | | | |
|  | A: | 0.643670E−01 | B: | 0.252304E−02 | C: | −.498704E−02 | D: | −.385130E−02 |
|  | E: | 0.141654E−01 | F: | −.127606E−01 | G: | 0.603021E−02 | H: | −.142532E−02 |
|  | J: | 0.127449E−03 | | | | | | |
| 11: |  | 5.36926 | | 0.843378 | | 544100.560900 | | |
|  | K: | −0.458859 | | | | | | |
|  | A: | −1.36670E+00 | B: | 0.728653E−01 | C: | −.357825E−01 | D: | 0.143189E−01 |
|  | E: | −.382053E−02 | F: | 0.585992E−03 | G: | −.386463E−04 | | |
| 12: |  | 1.38195 | | 0.341396 | | | | |
|  | K: | −4.463351 | | | | | | |
|  | A: | −.884249E−01 | B: | 0.569136E−01 | C: | −.307878E−01 | D: | 0.122772E−01 |
|  | E: | −.345874E−02 | F: | 0.659462E−03 | G: | −.804962E−04 | H: | 0.565542E−05 |
|  | J: | −.173349E−06 | | | | | | |
| 13: |  | INFINITY | | 0.300000 | | 516798.641983 | | |
| 14: |  | INFINITY | | 0.771671 | | | | |
| IMG: |  | INFINITY | | −0.000578 | | | | |

In a fifth exemplary embodiment of the present disclosure, the first lens 10 may have negative refractive power, and the first surface thereof may be concave and a second surface thereof may be convex. The second lens 20 may have positive refractive power, and both surfaces thereof may be convex. The third lens 30 may have negative refractive power, and a first surface thereof may be convex and a second surface thereof may be concave. The fourth lens 40 may have negative refractive power, and a first surface thereof may be concave and a second surface thereof may be convex. The fifth lens 50 may have positive refractive power, and a first surface thereof may be concave and a second surface thereof may be convex. The sixth lens 60 may have negative refractive power, and a first surface thereof may be convex and a second surface thereof may be concave. Further, the sixth lens 60 may have an inflection point formed on the second surface thereof. In addition, the stop ST may be disposed in front of the fourth lens 40.

The lens module 100 configured as described above may have improved spherical aberration and astigmatism distortion characteristics (please see FIG. 14). In addition, the lens module 100 may have improved coma aberration characteristics (please see FIG. 15).

A lens module according to a sixth exemplary embodiment of the present disclosure will be described with reference to FIGS. 16 through 18.

A lens module 100 according to a sixth exemplary embodiment of the present disclosure may include an optical system including a first lens 10, a second lens 20, a third lens 30, a fourth lens 40, a fifth lens 50, and a sixth lens 60, and may further include an infrared cut-off filter 70, an image sensor 80, and a stop ST.

Here, a distance (TTL) from a first surface of the first lens 10 to a first surface of the image sensor 80 may be 5.40 mm, a length (IMGH) of an imaging surface of the image sensor 80 may be 6.10 mm, and a distance (SL) from the stop ST to the imaging surface may be 4.02 mm. In addition, a viewing angle (ANG) of the optical system may be 70.00 degrees, and an F No. thereof may be 1.97. The lens module 100 configured as described above may satisfy all of Conditional Equations 1 to 3 (please see Table 7)

TABLE 6

| | | RDY | | THI | | GLA | | | | |
|---|---|---|---|---|---|---|---|---|---|---|
| OBJ: | | INFINITY | | INFINITY | | | | | | |
| 1: | | −7.75049 | | 0.250000 | | 638100.233700 | | | | |
| | K: | −0.098034 | | | | | | | | |
| | A: | −.375446E−02 | B: | 0.211851E−01 | C: | −.706070E−02 | D: | 0.761406E−03 | | |
| 2: | | −15.92290 | | 0.050000 | | | | | | |
| | K: | −0.100000 | | | | | | | | |
| | A: | 0.440356E−02 | B: | 0.302898E−01 | C: | −.942298E−02 | D: | 0.156098E−02 | | |
| 3: | | 1.83301 | | 0.696426 | | 544100.560900 | | | | |
| | K: | −1.192057 | | | | | | | | |
| | A: | 0.244945E−01 | B: | 0.138250E−01 | C: | −.367643E−02 | D: | 0.910730E−03 | | |
| 4: | | −14.44591 | | 0.050000 | | | | | | |
| | K: | 0.637479 | | | | | | | | |
| | A: | −.807990E−02 | B: | −.666900E−02 | C: | 0.585398E−02 | D: | −.914775E−03 | | |
| 5: | | −31.31799 | | 0.250000 | | 638100.233700 | | | | |
| | K: | −5.000000 | | | | | | | | |
| | A: | −.660184E−03 | B: | 0.510927E−02 | C: | −.831155E−02 | D: | 0.950939E−02 | | |
| | E: | −.277582E−02 | | | | | | | | |
| 6: | | 288.84525 | | 0.075216 | | | | | | |
| | K: | −1.000000 | | | | | | | | |
| | A: | 0.293572E−03 | B: | 0.100000E−02 | C: | 0.100000E−02 | D: | 0.100000E−02 | | |
| | E: | −.359781E−03 | | | | | | | | |
| STO: | | INFINITY | | 0.642177 | | | | | | |
| 7: | | −2.12131 | | 0.250000 | | 638100.233700 | | | | |
| | K: | 1.000000 | | | | | | | | |
| | A: | −.100000E−01 | B: | −.285720E−02 | C: | −.100000E−01 | D: | −.100000E−01 | | |
| | E: | 0.440956E−02 | | | | | | | | |
| 8: | | −3.68364 | | 0.222082 | | | | | | |
| | K: | −3.000000 | | | | | | | | |
| | A: | 0.227315E−01 | B: | 0.230012E−01 | C: | −.226625E−01 | | | | |
| 9: | | −2.83184 | | 0.668818 | | 544100.560900 | | | | |
| | K: | 0.707594 | | | | | | | | |
| | A: | −.100000E−02 | B: | −.100000E−02 | C: | −.388578E−04 | D: | 0.518908E−03 | | |
| | E: | −.100000E−02 | F: | −.991139E−03 | G: | −.997865E−03 | | | | |
| 10: | | −1.09885 | | 0.334447 | | | | | | |
| | K: | −0.780649 | | | | | | | | |
| | A: | 0.888209E−01 | B: | −.673022E−01 | C: | 0.208708E−01 | D: | 0.492459E−01 | | |
| | E: | −.997176E−01 | F: | 0.963499E−01 | G: | −.522180E−01 | H: | 0.154791E−01 | | |
| | J: | −.192796E−02 | | | | | | | | |
| 11: | | 22.53255 | | 0.576349 | | 544100.560900 | | | | |
| | K: | 1.000000 | | | | | | | | |
| | A: | −.967128E−01 | B: | 0.563383E−01 | C: | −.254697E−01 | D: | 0.879388E−02 | | |
| | E: | −.196347E−02 | F: | 0.244126E−03 | G: | −.126455E−04 | | | | |
| 12: | | 1.42650 | | 0.284485 | | | | | | |
| | K: | −6.076468 | | | | | | | | |
| | CUF: | 0.000000 | | | | | | | | |
| | A: | −.783845E−01 | B: | 0.512658E−01 | C: | −.288543E−01 | D: | 0.117620E−01 | | |
| | E: | −.334976E−02 | F: | 0.638908E−03 | G: | −.772709E−04 | H: | 0.532616E−05 | | |
| | J: | −.158244E−06 | | | | | | | | |
| 13: | | INFINITY | | 0.300000 | | 516798.641983 | | | | |
| 14: | | INFINITY | | 0.752005 | | | | | | |
| ING: | | INFINITY | | 0.000000 | | | | | | |

In a sixth exemplary embodiment of the present disclosure, the first lens 10 may have negative refractive power, and the first surface thereof may be concave and a second surface thereof may be convex. The second lens 20 may have positive refractive power, and both surfaces thereof may be convex. The third lens 30 may have negative refractive power, and a first surface thereof may be concave and a second surface thereof may be concave. The fourth lens 40 may have negative refractive power, and a first surface thereof may be concave and a second surface thereof may be convex. The fifth lens 50 may have positive refractive power, and a first surface thereof may be concave and a second surface thereof may be convex. The sixth lens 60 may have negative refractive power, and a first surface thereof may be convex and a second surface thereof may be concave. Further, the sixth lens 60 may have an inflection point formed on the second surface thereof. In addition, the stop ST may be disposed in front of the fourth lens 40.

The lens module 100 configured as described above may have improved spherical aberration and astigmatism distortion characteristics (please see FIG. 17). In addition, the lens module 100 may have improved coma aberration characteristics (please see FIG. 18).

TABLE 7

| | First Example Embodiment | Second Example Embodiment | Third Example Embodiment | Fourth Example Embodiment | Fifth Example Embodiment | Sixth Example Embodiment |
|---|---|---|---|---|---|---|
| TTL | 6.00 | 5.80 | 5.30 | 5.40 | 6.08 | 5.40 |
| IMGH | 6.10 | 6.10 | 6.10 | 6.10 | 6.10 | 6.10 |

TABLE 7-continued

| | First Example Embodiment | Second Example Embodiment | Third Example Embodiment | Fourth Example Embodiment | Fifth Example Embodiment | Sixth Example Embodiment |
|---|---|---|---|---|---|---|
| SL | 4.33 | 4.35 | 5.30 | 3.97 | 4.95 | 4.02 |
| ANG | 70.00 | 70.00 | 70.00 | 70.00 | 70.00 | 70.00 |
| e.f.l. | 4.27 | 4.27 | 4.27 | 4.26 | 4.28 | 4.05 |
| F No. | 1.85 | 2.00 | 1.85 | 1.95 | 2.00 | 1.97 |
| Conditional Equation 1 (TTL/IMGH) | 0.98 | 0.95 | 0.87 | 0.89 | 1.00 | 0.89 |
| Conditional Equation 2 (SL/TTL) | 0.72 | 0.75 | 1.00 | 0.74 | 0.81 | 0.74 |
| Conditional Equation 3 (ANG/F No.) | 37.84 | 35.00 | 37.85 | 35.90 | 35.00 | 37.06 |

Although the optical systems according to first to sixth exemplary embodiments of the present disclosure described above have some different characteristics as presented in Table 7, they may satisfy all of Conditional Equations 1 to 3.

As set forth above, according to exemplary embodiments of the present disclosure, aberration may be easily corrected and high resolution may be implemented.

Further, according to exemplary embodiments of the present disclosure, since an optical system may be configured only using plastic lenses, the optical system be lightweight and a costs required for manufacturing the lens module may be decreased.

While exemplary embodiments have been shown and described above, it will be apparent to those skilled in the art that modifications and variations could be made without departing from the spirit and scope of the present disclosure as defined by the appended claims.

What is claimed is:

1. A lens module comprising:
   a first lens having a negative refractive power;
   a second lens having a convex object-side surface or a convex image-side surface;
   a third lens having a concave image-side surface;
   a fourth lens having a refractive power;
   a fifth lens having a refractive power, and an object-side surface having a concave paraxial region; and
   a sixth lens having an inflection point formed on an image-side surface or on an object-side surface thereof,
   wherein the first, second, third, fourth, fifth and sixth lenses are disposed in a sequential order, from the first lens to the sixth lens, and
   wherein the lens module has a total of six lenses having a refractive power.

2. The lens module of claim 1, wherein the first lens to the sixth lens comprise plastic.

3. The lens module of claim 1, wherein the first lens has a concave object-side surface or a concave image-side surface.

4. The lens module of claim 1, wherein the fourth lens has a convex image-side surface.

5. The lens module of claim 1, wherein the fifth lens has a convex image-side surface.

6. The lens module of claim 1, wherein the sixth lens has a convex object-side surface.

7. The lens module of claim 1, wherein the sixth lens has a concave image-side surface.

8. The lens module of claim 1, wherein an optical system including the first lens to the sixth lens satisfies the following relationship:

$$TTL/IMGH<2;$$

wherein TTL is a distance from an object-side surface of the first lens to an imaging surface, and IMGH is a diagonal length of the imaging surface.

9. The lens module of claim 1, wherein an optical system including the first lens to the sixth lens satisfies the following relationship:

$$0.5<SL/TTL<1.1;$$

wherein SL is a distance from a stop to an imaging surface, and TTL is a distance from an object-side surface of the first lens to the imaging surface.

10. The lens module of claim 1, wherein an optical system including the first lens to the sixth lens satisfies the following relationship:

$$|ANG|/(\text{aperture }f\text{-number})>34;$$

wherein ANG is a viewing angle of an object.

11. The lens module of claim 1, wherein an optical system including the first lens to the sixth lens has an aperture f-number of 2.2 or less.

12. A lens module comprising:
   a first lens having a negative refractive power;
   a second lens having a positive refractive power;
   a third lens having a concave image-side surface;
   a fourth lens having a convex image-side surface;
   a fifth lens having a positive refractive power, and an object-side surface having a concave paraxial region; and
   a sixth lens having a negative refractive power,
   wherein the first, second, third, fourth, fifth and sixth lenses are disposed in a sequential order, from the first lens to the sixth lens, and
   the lens module has a total of six lenses, each lens having a refractive power.

13. The lens module of claim 12, wherein an optical system including the first lens to the sixth lens satisfies the following relationship:

$$TTL/IMGH<2;$$

wherein TTL is a distance from an object-side surface of the first lens to an imaging surface, and IMGH is a diagonal length of the imaging surface.

14. The lens module of claim 12, wherein an optical system including the first lens to the sixth lens satisfies:

$$0.5<SL/TTL<1.1;$$

wherein SL is a distance from a stop to an imaging surface, and TTL is a distance from an object-side surface of the first lens to the imaging surface.

15. The lens module of claim 12, wherein an optical system including the first to sixth lenses satisfies the following relationship:

$$ANG/(\text{aperture } f\text{-number}) > 34;$$

wherein ANG is a viewing angle of an object.

16. The lens module of claim 12, wherein an optical system including the first lens to the sixth lens has an aperture f-number of 2.2 or less.

17. A lens module comprising:
a first lens having a negative refractive power;
a second lens having a convex object-side surface or a convex image-side surface;
a third lens of which an image-side surface is concave in a paraxial region;
a fourth lens having a refractive power;
a fifth lens having a refractive power; and
a sixth lens having an inflection point formed on an image-side surface or on an object-side surface thereof,
wherein the first, second, third, fourth, fifth and sixth lenses are disposed in a sequential order, from the first lens to the sixth lens,
wherein the lens module has a total of six lenses, each lens having a refractive power,
wherein an optical system including the first to sixth lenses has an aperture f-number less than 2.2, and
wherein the first lens has a concave object-side surface.

* * * * *